United States Patent [19]

Metcalf

[11] Patent Number: 5,080,397
[45] Date of Patent: Jan. 14, 1992

[54] VEHICLE TIRE WATER SPRAY CONTROL SYSTEM

[76] Inventor: George E. Metcalf, 15805 SE. 12th Pl., Bellevue, Wash. 98008

[21] Appl. No.: 413,439

[22] Filed: Sep. 27, 1989

Related U.S. Application Data

[63] Continuation-in-part of Ser. No. 200,837, Jun. 1, 1988, abandoned, and a continuation-in-part of Ser. No. 509,875, Jul. 1, 1983, abandoned.

[51] Int. Cl.$^5$ ............................................. B62D 25/18
[52] U.S. Cl. .................................. 280/851; 280/848
[58] Field of Search ............... 280/851, 848, 849, 852, 280/850

[56] References Cited

U.S. PATENT DOCUMENTS

| | | | |
|---|---|---|---|
| 3,874,697 | 4/1975 | Thompson | 280/851 |
| 4,258,929 | 3/1981 | Brandon et al. | 280/851 |
| 4,436,319 | 3/1984 | Clutter | 280/851 |

*Primary Examiner*—David M. Mitchell

[57] ABSTRACT

A vehicle spray control system apparatus and method for suppressing spray and coalescing and directing water droplets thrown from rotating tires of vehicles via centrifugal forces comprises various embodiments of spray controllers adapted for selective locations on vehicles, such as large commercial trucks and tractor-trailer combinations. The preferred embodiments are used as: fender flap, between tractor-tandem, overwheel, floor sill, and general purpose spray controllers, located where droplets impact at high velocity and side skirts to condense low-velocity mist and carry the water rearward. Embodiments have a receiving side and an opposite side and comprise a plurality of symmetric or asymmetric wedges which extend from the planar surface of and are integrally formed with a base. In respective embodiments, these wedges either touch or are closely spaced apart at the receiving side of an unperforated base, or a base having slots. When used, a plurality of straight slots or slanted slots, respectively, pass either perpendicular to or at an angle through the base in respective embodiments. The spray controllers are formed from flexible or rigid durable materials such as high or low density polyethylene or rubber to resist summer heat, winter cold, impact, abrasion and chemicals, without softening or breaking. Flexible side skirts with longitudinal ridges or wedges having near horizontal upper surfaces extending toward the overwheel mist are also preferred embodiments.

39 Claims, 6 Drawing Sheets

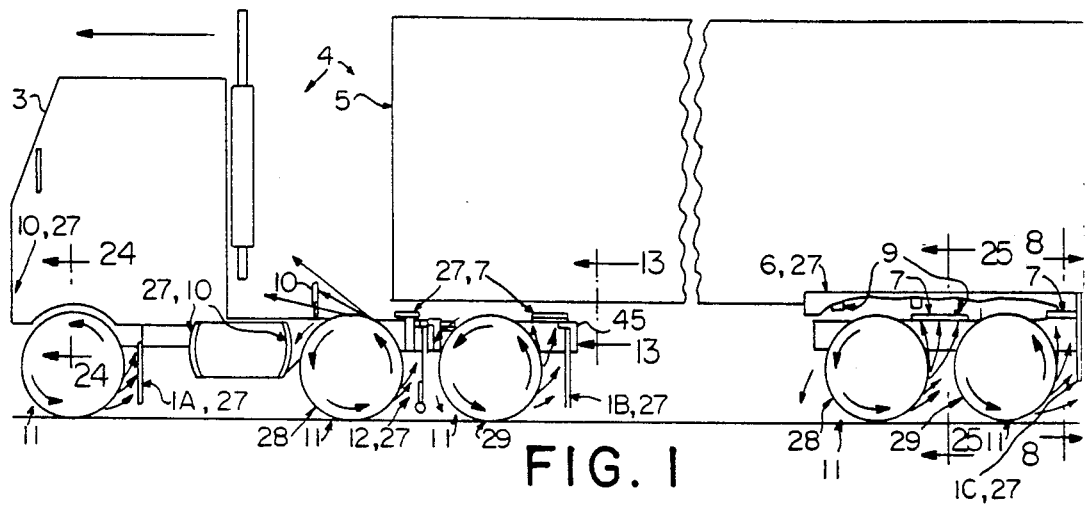
FIG. 1
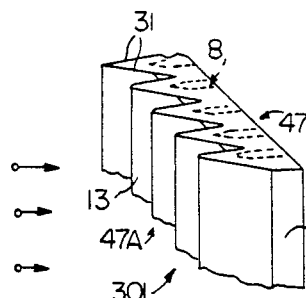
FIG. 2
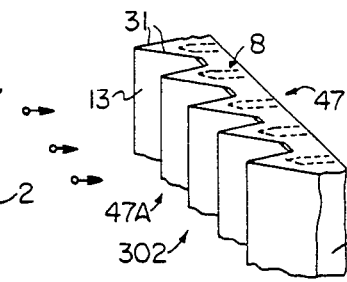
FIG. 3
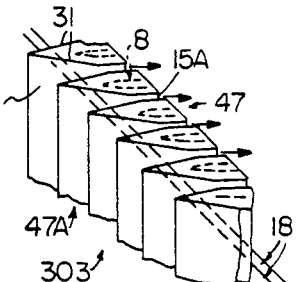
FIG. 4
FIG. 5A  FIG. 5B
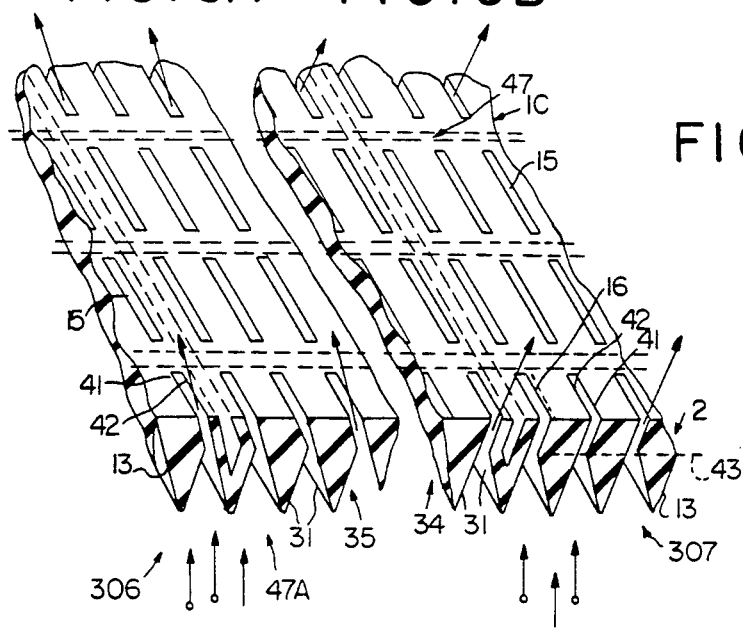
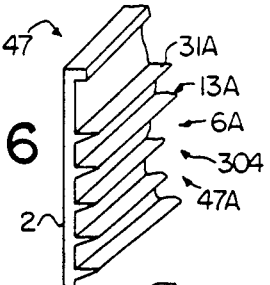
FIG. 6
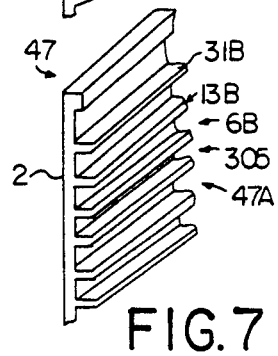
FIG. 7

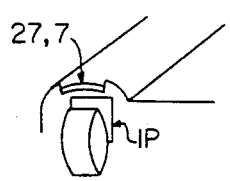
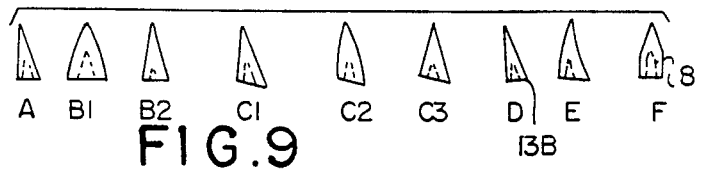
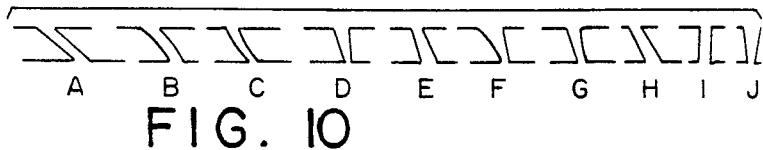
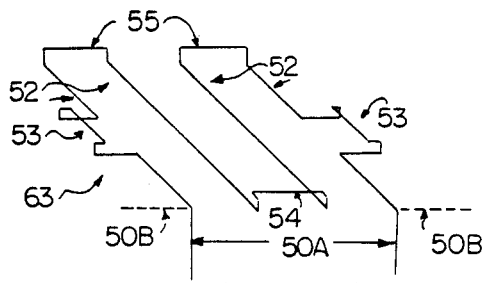
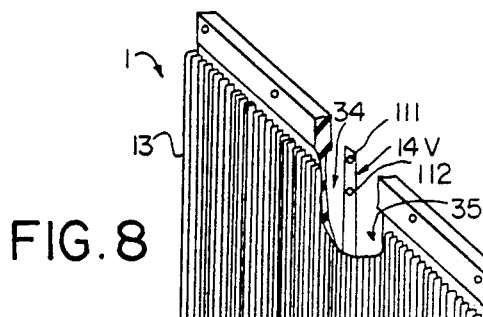
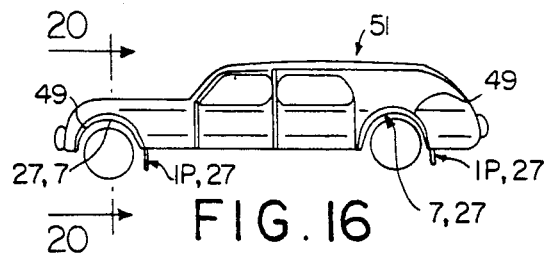
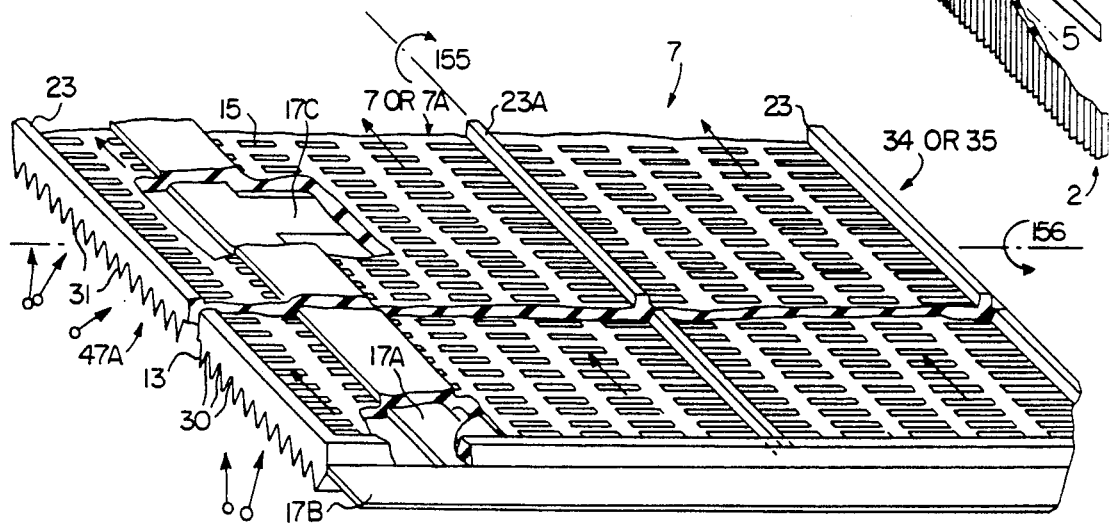

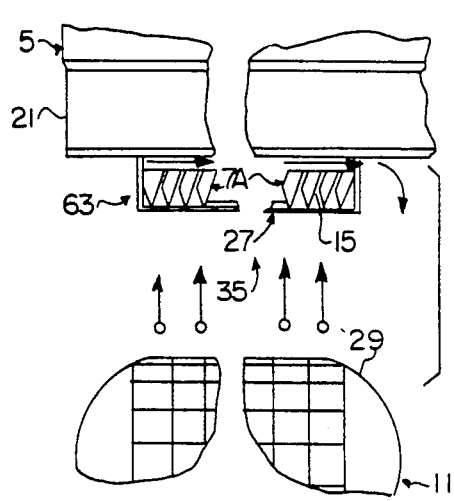
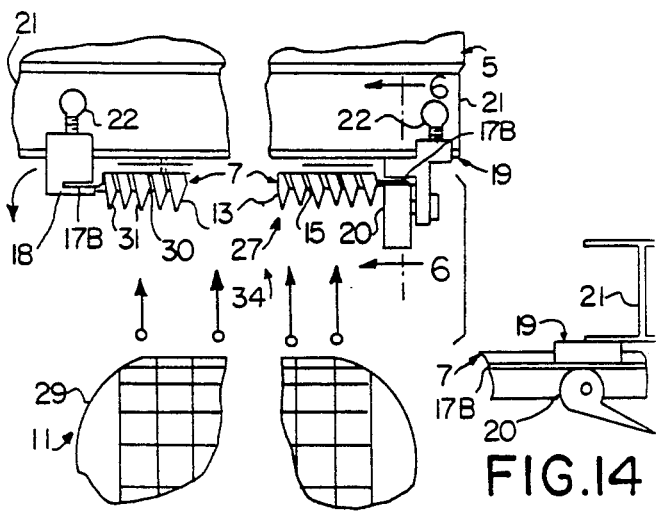
FIG. 13A  FIG. 13B  FIG.14
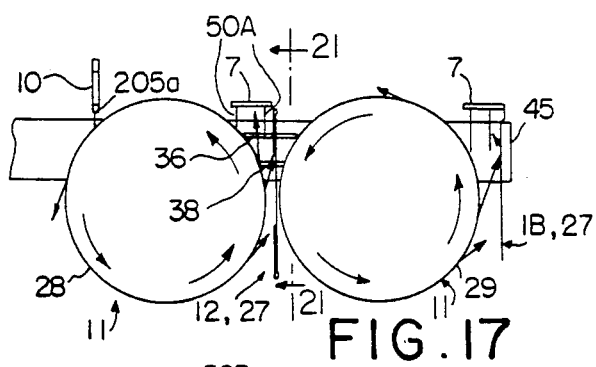
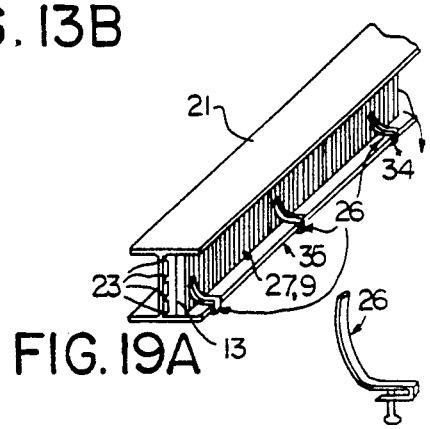
FIG.17  FIG.19A  FIG.19B
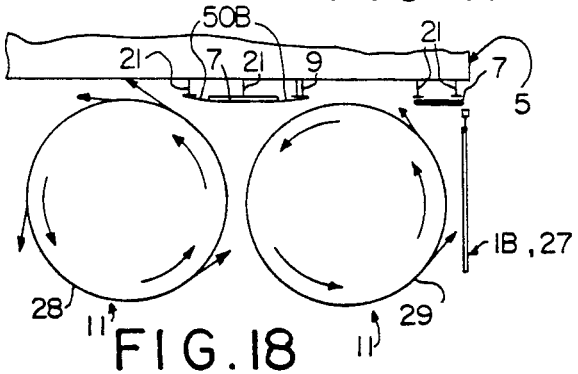
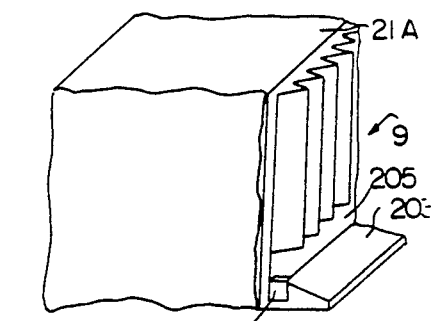
FIG.18  FIG.20
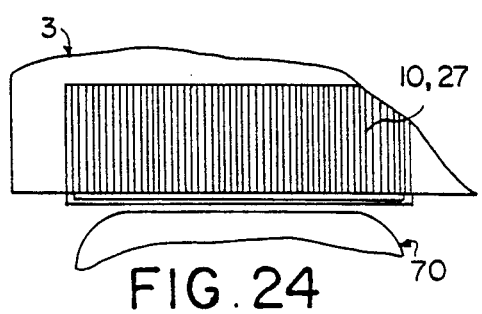
FIG.24

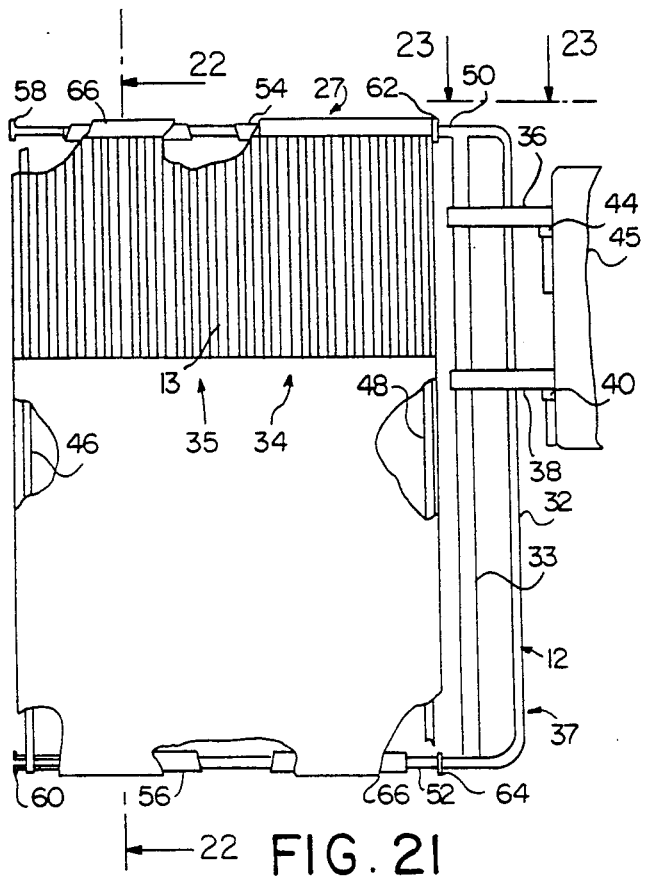
FIG. 21
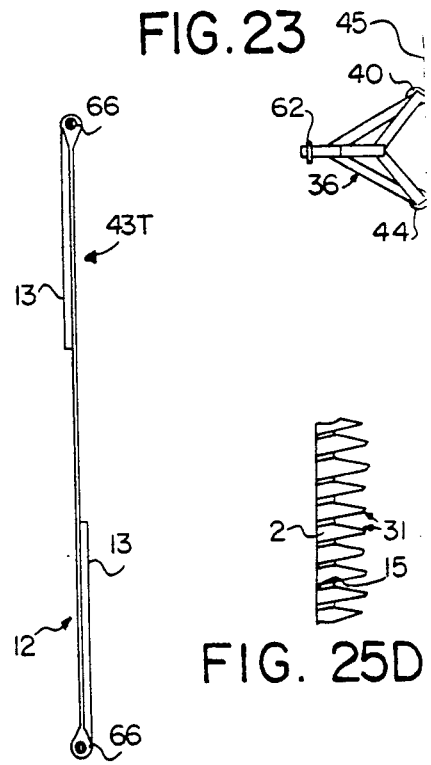
FIG. 23
FIG. 22
FIG. 25D
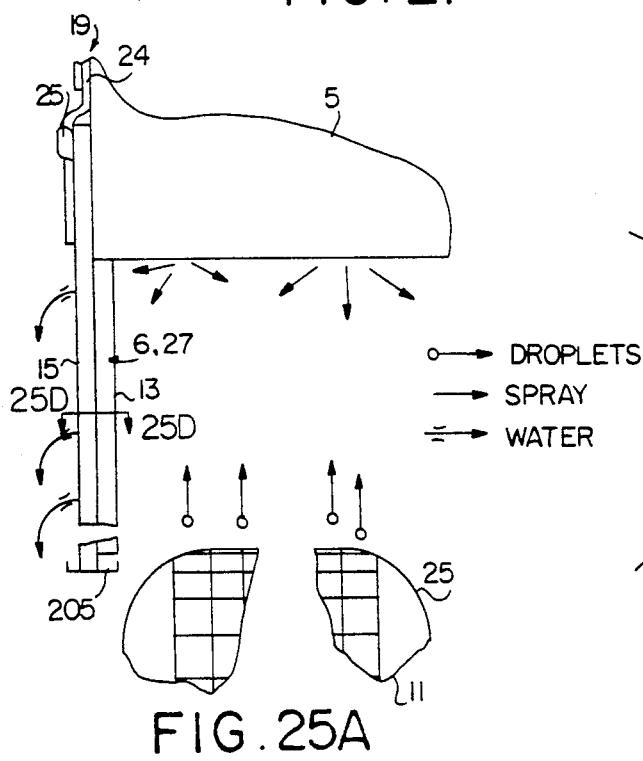
FIG. 25A
○→ DROPLETS
→ SPRAY
⇛ WATER
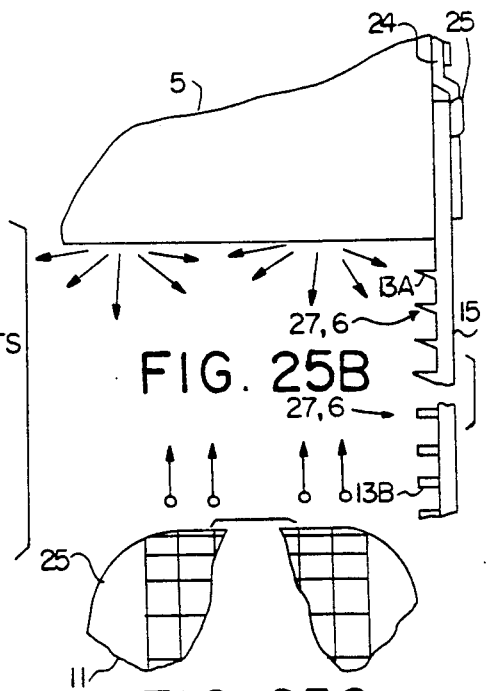
FIG. 25B
FIG. 25C

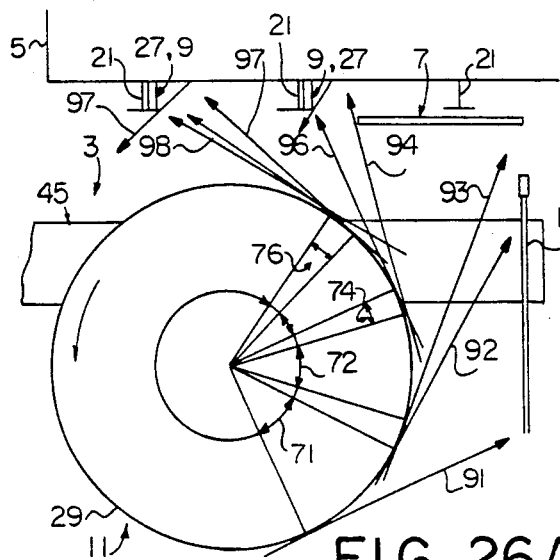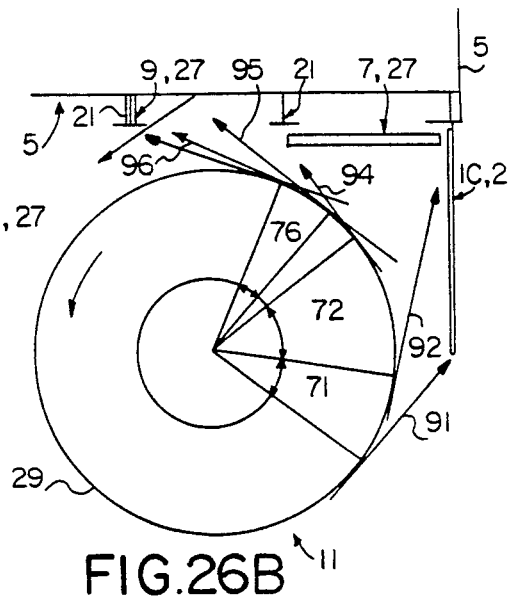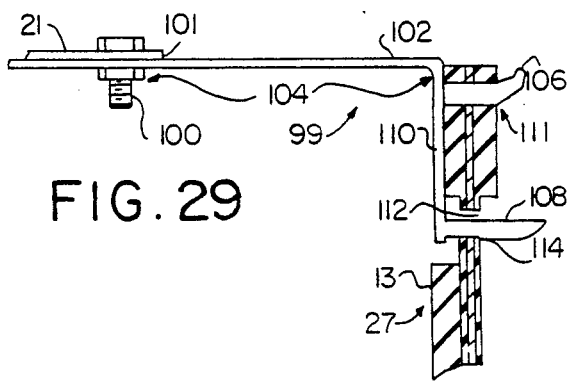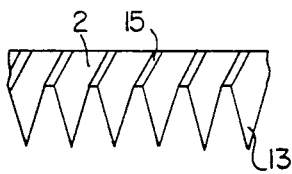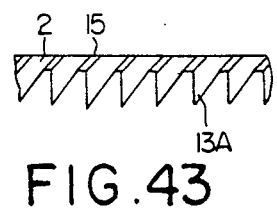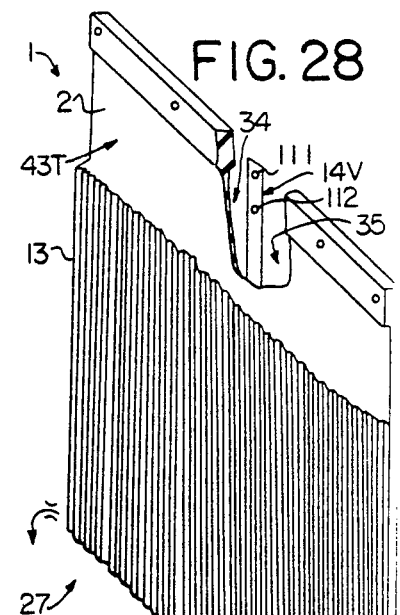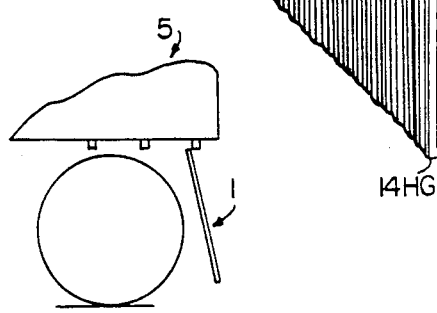

VEHICLE TIRE WATER SPRAY CONTROL SYSTEM

CROSS REFERENCES

This application is the third continuation in part application filed while the second continuation in part application Ser. No. 07/200,837, filed June 1, 1988, and now abandoned was still pending. The first and second continuation in part applications were determined to be considered as copending with the original application Ser. No. 06/509,875, filed July 1, 1983 and now abandoned. All three of these applications have the same title Vehicle Tire Water Spray Control System, and George E. Metcalf is the Applicant of all three applications.

BACKGROUND OF THE INVENTION

Water droplets of spray or "tread throw", hereinafter referred to as "throw" are thrown from rotating tires of vehicles traveling on wet road surfaces and impact against surfaces of the vehicle, causing the spray droplets to fragment into smaller droplets of mist. This presents the problem of impaired visibility to the drivers of these and other vehicles during wet conditions. Water thrown from the tires generally comprises large and small water droplets, some in the form of a mist or even a fog. Tests have demonstrated erratic directional control by drivers of following cars and trucks which are enveloped in this mist, especially that from large commercial trucks and tractor-trailer combinations which are moving ahead of them or beside them as they travel on the wet roadways. Drivers of these large vehicles also have difficulty seeing, via their rear view mirrors, through the spray generated by their own vehicles which occasionally causes accidents as these vehicles change lanes.

Several devices and apparatus for controlling road spray have been developed to reduce the impaired visibility for these drivers. For example, F. D. Roberts, in his U.S. Pat. No. 3,341,222 discloses a Vehicle Wheel Spray Collector which has alternate upward and downward flaring channels with slots spaced apart and located at the top of the upward flaring channels. These channels when arranged in the shape of a fender, collect water from the spray in the bottom of the downward flaring channels, which is thrown from the tires through the slots at the top of the upward flaring channels. A trough at the bottom of the collector collects the water and deposits it outside the tracks of the tires of the vehicle. The function of Roberts' invention is to collect the throw droplets rather than to directly coalesce, directly suppress, or direct the throw. Roberts' spacing and size of the slots in the channels and the excessive height of his corrugations, which are considered to be his wedges, permit spray to fall back onto the rotating tire beneath the collector to spray again.

Brandon et al. in their U.S. Pat. No. 4,258,929 disclose a Vehicle Spray Reduction Apparatus utilizing an unperforated mud flap having V's facing the throw above and behind tires and troughs behind the V's to carry the water rearward above the tires and to protect the downward flow behind the tires.

Reddaway in his U.S. Pat. No. 3,899,192 presents a Fender Flap Spray Controller which uses an artificial turf surface to collect the spray, wherein the water flows down behind the surface matting of the fender flap and is channeled away from the tires.

Roberts et al. in their U.S. Pat. No. 4,205,861 disclose an Automotive Vehicle Wheel Spray Collector, utilizing Roberts' earlier flaring channel design of his U.S. Pat. No. 3,341,222 in which flanges beside the slots and a ridge in the formerly flat backing is now used behind the channels and slots to deflect the spray droplets into the bottom of the downward flaring channels, within the water collecting tank beyond the channels. His wedges are too high and therefore some water flowing along them at an angle slows down, stops and falls back upon the tires to create more spray rather than entering the slots.

Irving in British Patent No. 1,584,453 discloses Improvements in Mud Flaps similar to Roberts' flaring fender, in which one or two layers of open-ended channel members guide spray into a containment region, in which it coalesces to form water which runs down in vertical V's and is deposited on the pavement near the center of the trailer.

Other fender flap designs such as the rubber button flaps made by National Rubber Company, also made by Buxbaum Company and also made by Konetta Company, are designed to suppress formation of mist from the high speed throw from tires. The Konetta spray control system is the system described by Lightle, et al. in their patent 4,382,606 of 1983. Lightle describes the function of these ribs and of those on the "splash guard" behind the wheel as "flow control" to direct the condensed water to flow in the desired direction. They have little to do with condensation and coalescence which are accomplished by the vertical wall of the skirt and the buttons or cones on the splash guard. The ten degree slope of the ribs simply eases removal from the mold. The ribs were neither intended to nor are they capable of suppressing speed throw. They use side skirts with vertical ridges separated longitudinally by 1 ½ inches to coalesce the water and to direct it to drain vertically downwardly thus preventing the rearward flow valued by side skirts of this invention which have horizontal wedges or ridges the distance between upper surfaces being between ½ and 2 inches.

In Heinz-Henning Jurges' U.S. Pat. No. 4,427,208 of 1984, his mudguard is used to prevent spray generated over, behind and ahead of the wheel from travelling laterally. Rather, it lets the water fall back upon the tire to spray again. Jurges' ribs or wedges are widely spaced apart and decrease in height as they approach the outer edge, continuing down the splash protector edge outside the wheel. These ribs or wedges will not carry water to fall near a splash guard because they are too small in profile and have a 50 degree symmetric vertex angle. In addition the downward slope of the fender and the air motion forward of the wheel blow the water back onto the tire in a crosswind and prevent these ribs from functioning as do the horizontal ribs and wedges of this invention.

Maurice Goodall, in his U.S. Pat. No. 4,290,609 of 1981 discloses gutters to carry collected water. His design does not include wedges, but provides screens for spray control. His screens are complex and difficult to clean, contrasting with the open ridges and wedges of this invention. He uses ram air rather than normal air flow to force the water rearward. His screens will quickly fill with dirt and ice and are not selfcleaning.

Pete A. Schons in his U.S. Pat. No. 3,834,732 of 1974 discloses a spray collector like Roberts' spray collector.

Removing Schons' openings would prevent spray control.

Thaddeus M. Ochs in his U.S. Pat. No. 3,473,825 of 1979 shows and describes stiffeners that run down both edges of the flap to prevent lifting and twisting, thereby holding this fender flap in position in the presence of the high speed air flow.

Harold V. Conner in his U.S. Pat. No. 3,877,722 of Apr. 15, 1975 describes a vertical stiffener attached to the fender flap and to rigid cross members at top and bottom to reduce twist and lift.

Ross A. McKenzie and Hans Busch in their U.S. Pat. No. 4,398,734 of 1983, include an overwheel splash guard with a solid base and rubber nipples facing downward, which permit the coalesced overwheel water to fall on the tire to make more spray. Also they provide a fender flap spray controller with rows of rubber buttons facing the spray. These rubber buttons suppress the spray and collect water that flows between the rows of rubber buttons, to ultimately fall to the surface below.

James E. Clutter in his U.S. Pat. No. 4,436,319 of 1984 uses a tank shaped like a fender having inner and outer walls separated by about one inch, similar to Roberts' fender, except that he uses laterally extending flanges around the periphery and flanges extending in the direction of rotation in the side portions to guide the throw into the tank. The water flow is not along the flanges, but transverse to them, the flanges deflecting the water into the tank from which it is drained to fall outside the paths of the tires. The flange openings and interior of the tank are not self-cleaning. The system ceases to function when filled with dirt and is very difficult to clean, except the exterior fender-like surfaces.

Fritz Buchner, in her German patent, reference DE 3635854 dated Oct. 22, 1986, shows an alternate method to trap the upward moving throw behind single axles. He has a forwardly and downwardly extending top portion of his fender flap which deflects the upwardly moving throw rearward to fall along the forward surface of the vertical part of his fender flap.

Although these specific prior advances have been made to try to control mist or spray, a significant improvement in visibility has not as yet been successfully accomplished by these earlier inventions as stated by the U.S. Department of Transportation in April 1988.

In reference to the history of these earlier inventions, the simple, flat fender flaps, also called mud guards, splash guards, or mud flaps, originally were hung behind rear tires to prevent mud from being thrown from roads onto following vehicles' windshields. Then fenders were used to improve the containment of mist, spray, and mud. However, with modern high speed travel on paved roadways, even widely separated ribs do not adequately suppress spray formation in fender flap or overwheel locations and narrow ribs alongside cannot carry the water to the fender flap location. Curved fender like wedge arrays with slots leading to containment regions are ineffective if the wedges are too high, thereby requiring condensed water from the throw, impacting at large angles from the radial direction, to flow too far along the wedge surface before entering the slots, flanged or otherwise, thereby allowing friction to stop it and it falls on the speeding tire to become copius spray.

It appears that earlier inventors did not achieve the savings and effectiveness of these simple flat arrays with low wedges for several reasons, such as their lack of awareness of:

the importance of keeping the angle of impact for overwheel slotted arrays near normal to the array;

the importance of using wedges having heights small enough to utilize the slots effectively, but large enough to effectively suppress mist formation;

the importance in reference to slotted arrays with straight slots, that is, slots perpendicular to the base, that the slots be deep enough in the direction of motion of the throw, i.e. base thickness, the wedge angle be large enough, the wedge height be high enough and the slot width in the lateral dimension be small enough, so that enough water accumulates in each straight slot to significantly reduce direct non-impact transmission of throw through the straight slots, this reduction thereby making it possible to eliminate the containment region and allowing the condensed water to flow directly to the road surface;

the importance or realization that following tires will have spray control equipment, and moreover, the largest amount of the water has been splashed laterally, so that the water returned to the tire tracks from the throw does not create a great problem;

the importance or realization that in using wedge arrays with slanted slots, the slots must be slanted enough and made long enough, i.e. the base made thick enough, to block direct transmission of spray;

the importance or realization that slanted slot arrays can be designed to deflect the condensed water in the direction desired, for example, over an overwheel array to fall inside the tires or with split flow, half inside and half outside the tires, a slight tilt downwardly toward the center assisting inward flow and a slight tilt downwardly and rearwardly of overwheel spray controllers behind single tires, duals and rear tandems assisting rearward flow of the deflected water;

the importance or realization that a crosswind blows the water from the bottom of a side skirt laterally to fall upon a tire and become spray again; and the importance or realization that the air passing under a vehicle is in part dragged along with the vehicle and therefore that water made to fall inside the tire tracks into this dragged air between them, does not break into as fine a spray as that falling into the high shear airstream outside the tire tracks.

SUMMARY OF THE INVENTION

This vehicle tire water spray control system provides better spray control, overcoming many of the deficiencies of prior spray control systems, and in doing so uses materials more economically and more effectively. The drivers of vehicles following vehicles equipped with this vehicle tire water spray control system enjoy improved visibility of the roadway ahead of them, improving their efforts to drive more safely.

Each embodiment of this spray control system has a receiving side and an opposite side. The receiving side comprises a plurality of symmetric or asymmetric wedges or ribs integrally formed with and extending outward from the planar surface of a base or its equivalent, in some cases the base being hollowed out beneath the wedges to reduce weight, cost of manufacture, and cost of materials. The symmetric wedges used on an unperforated base are at least 9/32 inch high for effective coalescence, but 15/32 inch or less in height for effectiveness in spray control, convenience of shipping, handling and installation, and for economy of manufacture. In some embodiments used in positions where the spray is less dense, the wedges abut one another. In others, exposed to more dense spray, they are spaced closely apart, but not more than 37% of the base width of the wedges, some embodiments having straight or slanted slots between the wedges. Symmetric or asymmetric wedges are used with slanted slots between. On side skirts, exposed only to the low speed mist from high speed throw impacting nearby surfaces, the horizontal wedges and ridges may be spaced farther apart, but the close spacing is more effective.

In the slotted embodiments a plurality of slots extend through the base between the wedges either perpendicularly, requiring larger apex angles on the wedges, other dimensions remaining equal, or thicker bases or narrower slots to accumulate enough water in the slots to prevent direct non-impacting transmission of throw through the spray controller, or in slanted fashion blocking direct through transmission with the rear wall of the slot. The slanted slots provide channels through the spray controller base through which water droplets and condensed water from the spray may pass after impacting a wedge or slot surface. In respect to this array, coalescence and deflection of the throw occur throughout the entire process.

The various spray controller embodiments are positioned in proximity to the tires. They include fender flap spray controllers, floor sill spray controllers with and without gutters, overwheel, between tractor tandem and general purpose spray controllers with wedges facing the throw, the floor sill spray controller being designed with a gutter in two designs to guide the coalesced water to fall in the relatively quiescent air toward the center of the vehicle rather than falling back onto rotating tires. The preferred overwheel spray controllers require slots all slanted in one direction to direct the water above the spray controller toward the center of the vehicle, a slight slope downward toward the center, and barriers along the front, rear, and outside edges to prevent water from falling back upon the tread where installed ahead of fender flaps. The overwheel spray controllers may use asymmetric wedges to provide more efficient, less turbulent, efflux from the slots.

In both positions, when used over dual tires, the overwheel spray controller will best have longitudinal strips along its center and along the inner and outer edges where little throw impinges, devoid of wedges and slots to prevent water from falling back upon the tires, the base sloping downward toward an inner barrier wall which has openings at both the forward and rearward ends, making the device interchangeable from the left side to the right side of the vehicle by 180 degree rotation.

An alternate design of the overwheel spray controller provides split flow, wedges on the left, symmetric or asymmetric, combined with slanted slots directing water on the left side to flow to the left, and that on the right side to flow to the right. In this case a bare strip at the outer edge, devoid of wedges and slots, tilting downwardly and outwardly and an outer gutter are introduced. In this case forward and rearward openings through both inner and outer barriers drain the gutters. This spray controller is mounted substantially horizontally over tandems, but may have a downwardly, rearwardly tilt behind tandems, duals and single tires.

Side skirt spray controllers having horizontal ridges or wedges are designed with greater wedge or ridge separation. They condense the secondary, slow-moving finer mist that flows laterally from the high speed impact area above the tires. This condensed water flows down to and along the preferably horizontal or near horizontal upper surfaces of wedges or ridges to fall the fender flap at rather ends being blown in a crosswind to fall upon the tire tread thereby generating copious spray. Skirts on the side facing into a storm's cross wind bend inward making gutters of the formerly horizontal wedge surfaces assisting the rearward flow. An alternate form of side skirt has vertical wedges with slanted slots between and a gutter below. These wedges may also be mounted on an unperforated base. The preferred vertical wedge design has slanted slots to direct the water and air rearward. It provides more effective coalescence by drawing more of the mist through the slots via the Bernoulli Effect, rather than having it flow under the side skirt to add to the mist blocking adjacent drivers' vision.

The wedges on embodiments directly intercepting high speed throw may be symmetric, having oppositely sloping faces with the apexes and the wedges being oriented symmetrically toward oncoming throw droplets, in order that droplets strike the surface at a small angle relative to the surface, thereby reducing collision energy and consequently spray formation, or they may have asymmetric wedges to better divert the flow in one direction as with several designs of the overwheel spray controller.

Upon striking the sloping surfaces of the wedges, the small spray droplets in part condense to form larger droplets which then travel along the sloping faces and into the region between the wedges forming water which bounces off fender flaps in large droplets during lift of the fender flaps or flows downward between the wedges. When slots are present, water and droplets flow into them and condense further into a stream-like flow to thereafter flow from the slots at the opposite side of the spray controller and onto the wet road surface. In the embodiment using straight slots, perpendicular to the base, the slots must be narrow enough and combined with wedges having apex angle, wedge height and base thickness, i.e. slot depth, large enough, 3/32 to 5/16 inch, to provide adequate water in the slots to largely prevent non-impact travel of throw through the slots. The slanted slots, when used in the fender flap spray controller, may be arranged to give flow in one direction, or in a split flow design wherein the slots on the right half of the spray controller are slanted to the right side and the slots on the left half of the spray controller are slanted to the left side, thereby in part directing the water away from the tracks of the rotating tires upon being discharged from the spray controller. Rather than simply collecting the spray and allowing it to coalesce in a closed region, these embodiments of spray controllers actually coalesce spray and suppress spray formation prior to directing the increasingly coalesced droplets in part away from the tires of moving vehicles so as to reduce impairment of driver visibility.

The spray controllers are made from an impact resistant, chemical resistant, abrasion resistant, weathering resistant flexible or rigid material appropriate to the application. Included are materials such as high or low density polyethylene, polyurethane, rubber and/or fibre, i.e. uncured residue from making tires or metal, and may be made using injection molding, compression molding, or extrusion, the slanted slots may be cut in a second process following the initial molding or extrusion.

ON RATIOS

It is interesting that ratios are of importance in the design of wedge arrays on which high speed throw impacts directly. For example:

For a given density of spray in terms of mass per second per square foot of area, if the wedge height is increased and its angle remains the same, the wedge separation, with or without slots, must be increased proportionately to maintain the same effectiveness by maintaining flow rate per unit area through the slot or downward, toward the road surface in the case of fender flaps, near the bases of the wedges the same, the same percent of the wedge projecting from the flowing water.

Where the depth of the slots is of importance for straight slots, as long as the water per unit area of the slot is maintained the same, varying the slot width in proportion to wedge height as above maintains the same blocking power of accumulated water in the slot.

Increasing wedge angles increases the collection area per slot and also reduces the average water speed through the slot, thus enhancing the blocking effect, i.e. accumulated water in the slot preventing nonimpact travel of throw through the slot. It is for this reason that the straight slot array requires a different wedge angle and therefore a different ratio of slot width to wedge base width than do slanted slots. In particular the best results observed for closely spaced apart wedges on an unperforated base and for slanted slots were obtained at a slot width to wedge base width ratio of approximately 25%. The mediocre results obtained for slanted slots at 37% and bad results at 50% may be explained by incomplete blockage of throw. In contrast excellent results were obtained for straight slots at a ratio of 17% and bad results at 23%. Thus an upper limit for the ratio has been selected midway between the good and bad results, namely 37% for closely spaced apart unslotted wedge arrays and for symmetric wedges with slanted slot arrays, by 50% for asymmetric wedge arrays with slanted slots. An upper limit of this ratio has been chosen as 22% for wedge arrays using straight slots. It is important to note that there are no flanges beside the slots in any of the arrays. A smooth flow of water and droplets into the slots is considered to be essential for best performance.

DESCRIPTION OF DRAWINGS

FIG. 1 is an environmental side view of the tractor-trailer vehicle with the various spray controllers of the vehicle spray control system mounted at various locations for suppressing, coalescing and directing the spray such as fender flap spray controllers behind each set of tandems, side skirt spray controllers, floor sill spray controllers, overwheel spray controllers and general purpose spray controllers. Arrows indicate the direction of the trajectory of the spray water droplets and the relative angles at which they impact the array of wedges on the receiving side of the spray controllers.

FIG. 2 is a section of a spray controller showing an array of abutting wedges.

FIG. 3 is a section of a spray controller showing an array of closely spaced apart wedges.

FIG. 4 illustrates a spray controller having an array of closely spaced apart wedges separated by straight slots, i.e. slots with center lines perpendicular to the surface of the base.

FIG. 5 shows a spray controller having an array which is inclusive of slanted slots on side A deflecting spray to the left and on side B deflecting spray to the right.

FIG. 6 is a section of a side skirt spray controller using horizontally aligned wedges, the top surface of which is near horizontal.

FIG. 7 is a section of a side skirt spray controller using horizontal ridges.

FIG. 8 illustrates a fender flap spray controller with an embedded vertical stiff bar abutting, welded to, or otherwise attached to a crosswise stiff bar near its bottom, thereby providing antilift and antitwist restraints.

FIG. 9 displays an assortment of symmetric and asymmetric wedge geometries.

FIG. 10 shows an assortment of slots having different wall geometries.

FIG. 11 illustrates a laterally curved overwheel spray controller over the tire of an auto and a fender flap behind.

FIG. 12 is an overwheel spray controller.

FIGS. 13A and 13B display trailer mounted overwheel spray controllers, the right one shown in FIG. 13B being held in position by a clamp and the left one shown in FIG. 13A being held by a special holder shown in FIG. 15 into which the controller can be simply inserted or removed, and easily tilted downward to the centerline or to the rear of the vehicle.

FIG. 14 illustrates the clamp to secure the overwheel spray controller having external steel bars, holders 18 and 19 being modified to obtain tilt.

FIG. 15 is an overwheel spray controller holder that can be mounted on a tractor or trailer into which the overwheel spray controller is simply inserted or removed and does not require internal reinforcement of the spray controller.

FIG. 16 displays an automobile with spray controllers.

FIG. 17 shows tractor-mounted spray controllers, overwheel, fender flap, between tractor tandem, and a vertical, general purpose, tractor-mounted, mirror-protecting spray controller.

FIG. 18 shows trailer mounted overwheel spray controllers over tandem axles without a between tractor tandem spray controller.

FIG. 19A is a floor sill spray controller with slanted slots attached to an I beam type floor sill.

FIG. 19B is a clamp to hold the floor sill spray controller in place.

FIG. 20A is a floor sill spray controller with abutting symmetric wedges and gutter attached to a channel-type floor sill.

FIG. 21 is a between tractor tandem spray controller (BTTSC) in its mount as seen from behind.

FIG. 22 is a side view of the BTTSC.

FIG. 23 is a top view of the BTTSC hanger.

FIG. 24 is an illustration of a general purpose wedge array bonded to the surface ahead of a tractor's front tire, having a gutter below to carry water toward the center of the vehicle.

FIGS. 25A, B, C, and D are side skirt sections as viewed from the rear.

FIGS. 26A and 26B show comparative spray controller angle coverages.

FIG. 27 illustrates a fender flap at an angle.

FIG. 28 is a fender flap with an external reinforcing horizontal anti-twist bar at its bottom which includes a gutter that empties water toward the vehicle center.

FIG. 29 is a lightweight flexible hanger for a fender flap.

FIGS. 42 and 43 illustrate configurations of symmetric and asymmetric wedges contiguous to slots having angles greater than the contiguous wedge slopes.

DESCRIPTION OF THE PREFERRED EMBODIMENTS

Introduction

Figure 30:
FIG. 30 is section 30—30 of FIG. 31 showing base 2, asymmetric wedges 13A, barriers 23, water velocity vectors VW across the top and down the end and slanted slots 15.

A vehicle spray control system, FIG. 1, apparatus and method are provided for suppressing, coalescing and directing "throw" thrown from rotating tires 11 of vehicles 4 via centrifugal forces generated by the rotating tires during travel of the vehicles 4 along the wet road surfaces. Wet road surfaces pose the hazard to drivers of vision impaired by spray from other vehicles particularly tandem tractor 3 trailer 5 combinations, and trucks as well as their own vehicles. Water droplets of the "throw" impact various surfaces on the vehicle, fragmenting into smaller droplets of mist, making it nearly impossible at times for a driver travelling behind or downwind to see even with the windshield wipers on. High speed travel of larger tractor trailer combinations, having tandem axles and several sets of dual tires, generate large amounts of spray and mist, especially between the tandem axles 28 and 29 of the tractor 3. The preferred embodiments of this invention are particularly adapted for use with tractor-trailer combinations whereby different embodiments of spray controllers 27 are positioned in selected locations on the tractor 3 and trailers 5 to control and direct the spray thrown by the tires, thereby suppressing the formation of mist by requiring high speed droplets to strike wedge surfaces at small angles. Thereafter, the droplets become coalesced into larger droplets and ultimately become discharged as larger droplets and/or flowing water streamlike in appearance while being directed downwardly, laterally, and/or away from the rotational path of the tires of the vehicle. Other embodiments or applications of the vehicle spray control system apparatus however, may be adapted for use with automobiles, with airplanes traveling on a runway or boats traveling on the water, for example.

Nine Physical Principles Underlie an Effective Vehicle Spray Control System

The effectiveness of the vehicle spray control system is based on the application of eight physical principles: first, a water droplet's collision energy with a surface and, therefore, the amount of spray generated by such collision is dependent upon the speed and direction of motion of the droplet relative to that surface, whereby the collision energy is decreasing continuously from a maximum when the direction of motion of the droplet is at normal incidence relative to the surface, to essentially zero when the direction of motion of the droplet is essentially parallel to that surface. Second, water droplets in mist and spray condense to form larger droplets of water more rapidly as their concentration increases by compression as it moves toward the bases of the wedges, or by glancing incidence on a wet surface. Third, with a constant rate of impact of throw per unit area of spray controller, water per unit cross-sectional area of collecting slots increases with the collection-area drained per slot and with the slot depth, i.e. base thickness, thus increasing with wedge angle, with wedge height, with base thickness and with decreasing slot width, thereby reducing nonimpact transmission of spray through straight slots more effectively by the same changes in variables, the effectiveness of spray suppression per unit area normal to the throw is proportional to the percent of effective wedge surface area available for impact by the throw, i.e. the wedge surface area extending beyond any water flowing between the wedges, plus effective in-slot suppression area available for impact by the throw. Thus, excessive water accumulation which reduces effectiveness by covering portions of the wedges is reduced by slots which transmit water through the base of the spray controller. Fifth, increasing slot cross-section increases the maximum water flow rate through the slot and decreases accumulation of water on the impact side of the spray controller, thereby maintaining suppression better in heavy throw, i.e. for deep water on the roadway. Sixth, for a given wedge angle and base thickness, the ratio of lateral wedge separation to wedge width must remain constant to maintain a given effectiveness of spray control, because the water flow between wedges keeps the percent of surface area above the water flow constant and the density of water per unit area in slots constant for a given ratio. Seventh, throw striking at near normal incidence to a wedge array with slots passes through the slots more efficiently as the flow distance along the wedge surface decreases, the effectiveness of a slotted array is increased as the end to end longitudinal separation of slots decreases compared to the longitudinal length of the slot. This can be referred to as the longitudinal slot separation to slot length ratio. Ninth, side skirts with horizontal wedges reduce the amount of water falling directly downward beside the wheels, that in a storm's side wind blows onto the upwind tires, and also reduces the amount of water caught in the upwind caused by tire rotation ahead of a fender flap, by carrying a significant amount of this water to fall behind the fender flap because the differential pressure is lower behind the fender flap than ahead of the fender flap.

Thus, the optimum combination of wedge height, wedge angle, wedge separation, i.e. slot width if slots are used, and base thickness if slots are used, depends on the water depth on the roadway and the positioning and function of a given spray controller. For example, abutting wedges would be adequate for floor-sill spray controllers which receive less dense throw than do fender flaps or overwheel spray controllers. Straight slots are best behind wheels, and slanted slots essential over the wheel. But, although more expensive to manufacture, slotted versions out perform unslotted designs.

Method of Suppressing, Coalescing and Direction Larger (Water) Droplets and a Stream-like Flow of Water Through the Spray Controller: Application of the Nine Physical Principles The first physical principle is evidenced by the fact that the sloping faces 31 of the wedges 13 and the forward surface 41 and rearward surface 42 of the slots are positioned at an angle relative to the oncoming water droplets of the spray such that the droplets of water strike the wedge sloping faces and slot surfaces at grazing incidence, generally not more than 20 degrees from surface parallel for symmetrical wedges with unslotted embodiments, not more than 30 degrees for symmetric wedges with slanted slot embodiments, not more than 45 degrees for the asymmetric wedge of FIG. 9D with slanted slot embodiments, but over 20 degrees for symmetrical wedges used with straight slots.

The droplets' first impact is of energy proportional to $\frac{1}{2} m (v \sin \phi)^2$ where m is the mass and $\phi$ is the angle between the velocity and the surface parallel. Collision energies at angles of 45, 30, 15 and 10 degrees are reduced to 0.5, 0.25, 0.067 and 0.030 respectively times the value at normal incidence. Thus water droplets break into fewer secondary droplets than they would at normal incidence. Those droplets of water that do not wet the wedges 13 and flow along their sloping faces will bounce off the wedge sloping faces at small angles. Glancing impacts of the spray droplets convert more energy to heat because of enhanced surface and internal friction rather than to increase surface energy by mist formation. Collisions of the secondary droplets of water occur generally at lower speed, many on the opposite wedge face. Upon impacting the sloping wedge faces in secondary collisions, the secondary droplets of water will coalesce to form larger droplets and eventually most remaining droplets pass into the slots 15 or into the downward flow of water between the wedges 13.

Application of the second physical principle is illustrated with good experimental results in relation to abutting wedges and to the closely spaced apart wedges with nominally 1/16 inch separation at the point of junction of 7/16 inch high, 35 degree symmetric wedges 13 with the base 2, unslotted; or having 45 degree 7/16 inch high symmetric wedges with longitudinally aligned straight slots through a ¼ inch thick base, and to the configuration with 7/16 inch high 35 degree wedges with slanted slots through the base at the wedge half angle of 17.5 degrees. As the water droplets of spray approach the receiving surface 47A, they pass between the apexes of the wedges; their concentration increases as they approach the base through the increasingly constricted area and the mist-like droplets thereby increase their rate of coalescence. Glancing impact of the water droplets on the wedge sloping faces 31, and on rearward surfaces 42 of the slots in the slanted slot configuration, also enhances further coalescence of the water droplets from the spray to eventually form larger droplets and a flow of water which is stream-like in appearance.

Water droplets and residual spray, if impacting nearly perpendicularly to the base, also move through the thick base through slots 15 or 15A at high speed, except slowed more for larger wedge angles. Symmetric wedges of 7/16 inch height and 45 degree apex angle experimentally allowed 1/16 inch wide by ¼ inch deep straight slots, i.e. a slot width to wedge width ratio of 17%, to be extremely effective by virtue of physical principle number 3 collecting enough slow velocity water to effectively prevent non-impact transmission of high speed throw through the straight slots 15A. Whereas symmetric wedges with 35 degree apex angles, i.e. a slot width to wedge width ratio of 23%, were found to be ineffective for 1/16 inch wide straight slots using 7/16 inch high wedges. Physical principles 4 and 5 were experimentally well satisfied using the former parameters for straight slots and fairly heavy water throw. Thus, for straight slots an upper limit for this ratio is selected as 22%, less than the ratio 23% for which experimental results were poor. Thus physical principle 6 is evidenced as preferably a 17% ratio for straight slots. For higher wedges or larger angles thinner bases are effective, whereas lower wedges or narrower angles require thicker bases. For straight slots a range of base thicknesses is from 3/32 to 5/16 inch, of wedge heights 7/32 to 15/32 inch, wedge angles 40 degrees minimum, and a wedge spacing no more than 22% of wedge base width.

For unslotted and slanted slot arrays mediocre results were experimentally obtained using 3/32 inch separation and poor results using ⅛ inch separation between symmetric wedges for both unslotted and slanted slot bases at 35 degree apex angle, 7/16 inch high wedges and ¼ inch base thickness, the poor results for slanted slots being caused at least in part by incomplete blockage of directly transmitted spray, to be compared to excellent results for the same configurations and parameters with 1/16 inch wedge separation between the symmetrical wedges at the base; thus for closely spaced apart unslotted arrays an upper limit for the lateral wedge spacing to wedge base width ratio is selected as 37%, midway between the excellent results observed at 25% and the poor results observed at 50%. Thus physical principle number 6 is evidenced as 25% between symmetrical wedges and closely spaced apart unslotted arrays. Thus wedge heights are from 9/32 to 15/32 inch, wedge angles 30 to 40 degrees and separation ratios 37% or less. However, an upper range of 50% is chosen for symmetrical and asymmetrical wedge arrays with slanted slots providing complete blockage of directly transmitted spray. For asymmetrical wedges ¼ inch high, 35 degrees, with ⅛ inch thick base and 1/16 inch wide slots of length 1 inch and end-to-end spacing ⅛ inch good experimental results have been attained at this slot width to wedge width ratio of 36%.

Principle number 7 is evidenced by maintaining the throw impact direction as nearly normal to the slotted arrays as possible and the wedge height low, thereby preventing fenders with high wedges curved along the longitudinal direction of the wedges from being effective. Thus fender flaps, overwheel spray controllers, floor sill spray controllers, and between tractor tandem spray controllers are evidenced to control direct throw and have parameters as shown above.

Principle number 8 is evidenced by keeping the longitudinal, end to end, slot separation as short as possible consistent with adequate lateral strength. Experimentally good results were obtained at 33% or ¼ inch separation and ¾ inch slot length. Better ratios less than 33% will be possible using metal, plastics such as high or low density polyethylene, urethane or a fibre plus new rubber or new rubber only with lateral strands of high strength fibers such as those sold under the trade names of Aramid or Kevlar, indicated as dashed lines 18 between the slots in FIGS. 4 and 5. This ratio maximum is 35% and the minimum slot length ½ inch. Physical principle 9 is evidenced by results using 35 degree symmetric wedges horizontally aligned on a side skirt and extending to the fender flap behind the rear tandem tire, while running in the rain at 55 m.p.h. A film indicates that the water is blow rearwardly as it flows down across the wedges on the inner side of the skirt as it is seen falling largely near the fender flap. Horizontal upper surfaces will make this flow more efficient with a significant amount of this water falling behind the fender flap.

Figure 32:
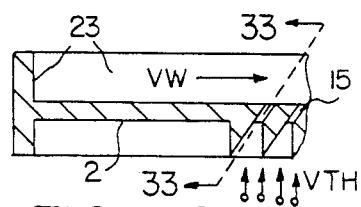
FIG. 32 is section 32—32 of FIG. 31 showing barrier 23, base 2, and asymmetric wedges 13A. VTH is the throw velocity.

The Vehicle Spray Control System Apparatus Centers on the Use of Spray Controllers As shown in FIGS. 2-7 of the drawings, the spray controllers 27 of the vehicle spray control system apparatus, have a receiving side 47A and an opposite side 47, and comprise arrays of parallel, closely spaced apart wedges 13, or 13A shown in FIG. 32, aligned with the rotational planes of the tires, or spaced apart wedges 13A or ridges 13B with near horizontal upper surfaces 31A and 31B which are integrally formed with a base 2 which extends from the base of the wedges to the opposite side. The base for surfaces receiving direct impact of high speed throw is illustrated as having a planar surface although it may be curved for applications shown in FIGS. 11, 16 and 24. The dashed lines of FIGS. 2, 3, 4, 5 and 9 indicate a hollowing of the base below the wedges for the alternate embodiments in which case the "opposite side" is defined as if there were no hollowing. The hollowing increases speed of manufacture and reduces materials required, thereby reducing cost. Also, the lighter weight is preferred by truck fleet managers.

Figure 33:
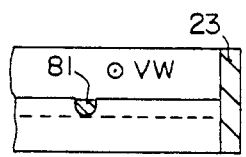
FIG. 33 is section 33—33 of FIG. 32 showing a best cross section 81 of the material between adjacent ends of slots that are end to end.
Figure 39:
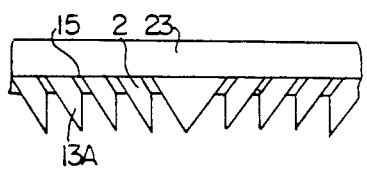
FIG. 39 is section 39—39, a modified section 35—35 of FIG. 31, to illustrate an alternate design for this overwheel spray controller which alternate design has bidirectional flow, the wedges and slots on the left deflecting water to the left and those on the right deflecting water to the right.
Figure 40:
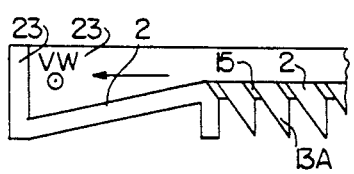
FIG. 40 is section 40—40, modified from section 32—32 of FIG. 31, to illustrate the outside gutter of this alternate design for the overwheel spray controller in FIG. 31.
Figure 41:
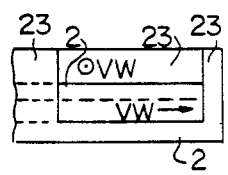
FIG. 41 is section 41—41 of FIG. 31 to illustrate a rear opening through the outer barrier for this alternate design of the overwheel spray controller of FIG. 31, this design having both forward and rearward openings in both outer and inner barriers.

The symmetrical wedges 13, each shown having opposite sloping faces 31, which, in arrays receiving high speed throw, directly converge at their outermost point at an apex wherein the wedges 13 are arranged on the base 2 to point symmetrically toward the oncoming spray as it is thrown from the tires 11 during travel of the vehicle 4 along the wet road surface. The bisectors of the sloping faces 31 of the wedges 13 are positioned in parallel alignment with the plane of rotation of the wheels and tires of the vehicle. The side skirt spray controllers 6, however, have wedges 13A or ridges 13B in which the upper faces 31A and 31B are near horizontal and positioned as shown in FIG. 25B and 25C perpendicularly to the plane of rotation of the tires facing the mist formed over the tires. The overwheel spray controller of FIGS. 30-38 illustrates the use of asymmetric wedges 13A of FIG. 9D with slanted slots as in FIG. 30 to direct the efflux from the slots toward the vehicle center line. FIG. 33 shows a cross section 81 of the material between the ends of aligned slots, rounded to improve flow of water into the slots. FIGS. 39 to 41 together with FIG. 31 illustrate an alternate overwheel configuration having bidirectional flow and both external and internal gutters.

The most fundamental embodiment of the spray control surface 301 is shown in FIG. 2 where adjacent wedges 13 are longitudinally aligned in the spray suppressing and coalescing surface array and in contact at the receiving side of the base.

The symmetrical wedges of FIGS. 2 and 3 must be high enough, in the range of 9/32 to 15/32 of an inch, from their base to apex, to allow the impact of water, droplets, and spray on their surfaces, while water runs downwardly near their bases to a gutter or to the road surface, or large coalesced drops fall from the surface, if inclined during lift, to fall to the road. The maximum height is selected to avoid excess cost of manufacture, for convenience of installation, and to maintain some flexibility for modest lift. The wedge apex angle must be large enough, at least 30 degrees, to allow space for the water to flow, yet small enough, 40 degrees or less, to significantly reduce the impact energy of collision with the surface.

In the second most fundamental embodiment of the spray control surface with an unperforated base, 302, FIG. 3, the longitudinally aligned wedges are shown spaced closely apart, preferably 25% but no more than 37% of the width of the wedge base, in the array to allow water to flow more freely along the space between the wedges under heavy water conditions. Assuming constant throw rate the effectiveness of coalescence and suppression gradually decreases as the separation of wedges at their contact with the impact side of the base increases because the percent of the lateral area effective in suppression and coalescence decreases. In contrast, as the throw rate increases from wetter surfaces, however, the water with wedges separated can flow in greater volume along the receiving side of the base, leaving a larger portion of the wedge beyond the water. To assure adequate control of throw by fender flaps, angles, heights and separation of wedges are restricted as previously discussed.

In the most fundamental embodiment of the spray control surface 303 having perforations through the base between the wedges, as shown in FIG. 4 and best used for fender flaps, elongated slots 15A are longitudinally aligned and spaced apart between the wedges 13 to form apertures through which water and air may pass during travel of the vehicle. Each slot extends through the base, as shown in FIG. 4, at right angles to the surface of the base and extends from the foot of one wedge to the foot of the adjacent wedge, the foot being that portion of the wedge which lies in the surface of contact between the wedge and the impact surface of the base, or the plane of transitions from wedges to slots. In this embodiment a slight divergence of the sides of the slot from the wedge base plane to the opposite side will maintain effectiveness, but reduce the problem of material thrown up from the roadway blocking the flow.

In the most effective but most difficult to manufacture embodiments of the spray controllers 27 receiving direct impact of high speed throw, slanted slots extend through the base 2, being longitudinally aligned and spaced apart between the wedges 13 to form apertures through which water and air may pass during travel of the vehicle. This slanted slot array is especially valuable over the wheels. As shown in FIG. 5 each slot has a forward surface 41 and rearward surface 42 with the rearward surface being a continuation of a sloping face of the adjacent wedge 13. As shown in FIG. 5, the slots 15 extend through the base 2 slanted at an angle relative to the planar surface 43 of the base 2 to prevent the spray from passing directly through the slot 15 without impact, whereby it provides the impediment to the motion of the water droplets, thereby assisting in the coalescence of the water droplets of the spray and directing the larger water droplets and coalesced stream-like flow of water in the direction desired.

The primary embodiments of the fender flap spray controllers are either unslotted or have straight slots 15A between the wedges or have a plurality of wedges 13 or 13A and slots 15 utilizing a "split flow" design as shown in FIG. 5 whereby the slots 15 on the left half 35 of the spray controller are angled to the left thereby directing large droplets and stream-like water from the left of the opposite side 47 of the spray controller to the left and the slots 15 on the right half 34 of the spray controller 27 are angled to the right so as to direct the larger droplets and flow of stream-like water from the right of the opposite side 47 of the spray controller to the right.

The primary embodiment of the overwheel spray controller has a center flow design. In this embodiment the slots are all slanted in one direction. These slots direct the water flow, from the coalesced and suppressed upwardly moving throw of spray and water, toward the center of the vehicle. Thereafter the collected water falls beyond the tires, in relatively quiescent air.

In the event that manufacturing costs are prohibitively expensive for slanted slots, the straight slot array of wedges may be used over the wheel, the array being tilted downward toward the vehicle center and barriers may be used to prevent forward, rearward and outward flow off the controller. More water will, however, with this design, fall back upon the wheel than when slanted slots direct the water over the controller toward the vehicle center.

Economy of manufacture may be achieved for these and other controllers and performance enhanced by eliminating slots and wedges in longitudinal strips along their centers, along their inside edges and along their outside edges over, ahead of and behind duals for which the controllers are generally about 24 inches wide, because little spray normally impacts these positions and for overwheel controllers some water would fall through such slots and fall back upon the tire.

Figure 34:
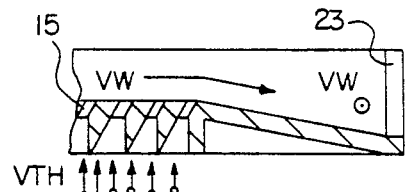
FIG. 34 is section 34—34 through the rear opening in the inner barrier of FIG. 31 showing the gutter formed at the inner barrier 23.
Figure 35:
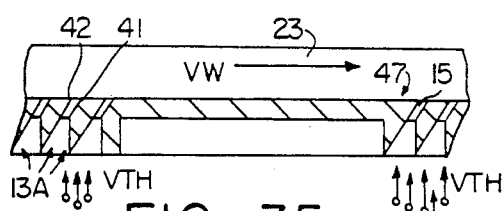
FIG. 35 is section 35—35 of FIG. 31 showing the central longitudinal band of the base devoid of slots and wedges.
Figures 36, 37:
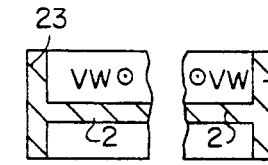
FIG. 36 is section 36—36 of FIG. 31 showing the rear barrier.
FIG. 37 is section 37—37 of FIG. 31 showing the forward barrier.
Figure 38:
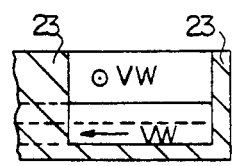
FIG. 38 is section 38—38 of FIG. 31 showing the forward opening in the inner barrier.

The inner portion of the base plane of overwheel spray controllers may have no wedges or slots, but slope downward to an inner barrier to form a shallow gutter, FIG. 34, the inner edge having a barrier 23 that has openings 150 fore and aft to allow the water to flow in a stream toward the road surface.

On Wedges and Slots

Asymmetric wedges may be used to allow the plane of symmetry of the wedges to lie in the plane of the wheel rotation, where the base is curved laterally as in FIG. 11. Curved "wedge" surfaces such as the configurations B1 or C2 in FIG. 9 may be used to increase impact strength. Configurations D and E of FIG. 9 combined with slanted slots provide more efficient deflection of the efflux from the slots in a desired direction with less turbulence allowing greater slot angles up to 45 degrees and smaller base thicknesses to 3/32 inch. The curved configuration E may be used to improve the flow of water into the slot. The configuration F may be used with unslotted arrays to allow more water to flow between the wedges at constant separation while maintaining effective spray control.

Curved slots, as shown in FIG. 10, configuration C, can be used to better direct water flow in a desired direction. Divergent slot widths, as in configurations E and H, can be used to reduce slot blockage, caused by debris. The divergence is indicated by dashed line 16 in FIG. 5.

Slot angles greater than wedge angles, as shown in FIGS. 42 for symmetric and 43 for asymmetric wedges allow the efflux from the slots to be more nearly parallel to the surface. Manufacturing is difficult for such a design.

The Spray Controllers of the Vehicle Spray Control System Apparatus Comprise Several Embodiments. Adapted for Use, for Example, on Tractor-Trailer Combinations FIG. 1 shows a vehicle 4, such as a tractor 3, trailer 5 combination equipped with the various preferred embodiments of the spray controllers of the vehicle spray control system apparatus, including: fender flap spray controllers 1, 1A located behind the steering axle of the tractor 3, 1B behind the rear tire of the tractor tandems 28 and 29, and 1C behind the rear tire of the trailer tandems; a side skirt spray controller 6; an overwheel spray controller 7; a floor sill spray controller 9; general purpose spray controllers 10 shown ahead of the steering tire, on the fuel tank ends and ahead of the forward tractor tandem to protect the mirror from throw; and a between tractor tandem spray controller 12.

The Fender Flap Spray Controllers of the Vehicle Spray Control System Apparatus The fender flap spray controllers, using wedge arrays shown in FIGS. 2, 3, 4, 5, and 35 are suspended vertically from the vehicle behind the rotational path of the tires of both the tractor 3 and the trailer 5. A preferred orientation as shown in FIG. 27 is at an angle. The wedges 13 or 13A in all fender flap embodiments are positioned in parallel alignment with the planes of rotation of the tires.

Fender Flaps With Closely Spaced Apart Wedge Arrays

FIGS. 2 and 3 illustrate the unperforated, i.e. unslotted, version of the fender flap spray controller 1 wherein the wedges are shown abutting in FIG. 2 and closely spaced apart in FIG. 3, the latter allowing heavier flow of water between the wedges, but the former providing, in less dense spray, the greater percent surface area for spray suppression and coalescence. In realistic on-road conditions with normal lift of the spray controller or slanted installation of a more rigid fender flap in FIG. 27, the abutting wedges provide effective suppression and coalescence because the large coalesced drops tend to bounce out and fall to the roadway rather than flow nicely between the wedges to the bottom of the controller and thence to the road surface. The lower wedges are more economical to make, to ship, and to install. The effective area is enhanced by increasing wedge height where water flows between the wedges. Wedge height is from 9/32 to 15/32 inch Wedge separation is less than 37% of wedge width.

The design is self cleaning. Under heavy water conditions, the closely spaced apart array is preferred. In this case the ratio of wedge separation to wedge width of 25% provided excellent experimental results. Where hollow wedges are used, illustrated by the dashed lines 8 in FIGS. 2 to 4 and by the wedges, second from left in FIGS. 5A and 5B and in FIG. 9, weight is reduced as is also the cost of material and cost of production because the molding time is reduced although the mold cost is increased. Also the mold cost is less for lower wedges.

Fender Flaps With Straight Slots Between Closely Spaced Apart Wedges

FIG. 4 illustrates the closely spaced apart wedge array having slots perpendicular to the base. Although more effective in controlling spray, it is also more expensive to manufacture. Experimentally it was proven to provide excellent spray control with wedge apex angles of 45 degrees, wedge height of 7/16 inch, slot width to wedge base ratio of 17% using 1/16 inch wide slots, wedge bases 0.36 inch wide, and a base thickness of ¼ inch. Variation of wedge height or angle requires variation of slot width and/or base thickness. Thus, the range of slot widths is from 1/32 inch to 3/32 inch and the range of base thickness is from 3/32 inch to 5/16 inch. Other parameters identical, straight slots gave poor results using 35 degree wedges or a 23% ratio. Thus an upper limit of 22% for this ratio of slot width to wedge base width is selected. The range of wedge heights is from 7/32 to 15/32 inch.

Effectiveness improves with slot length for a given end-to-end slot separation. The ratio of end-to-end slot separation divided by slot length attainable is dependent on the strength and rigidity of the material of construction. Experimentally, slot lengths used through ¼ inch thick neoprene rubber have been ¾ inch with ¼ inch end-to-end separation; and, using 90 durometer rubber ⅛ inch thick, slot lengths of 1 inch and 1/8 inch separation were used, but only with slanted slots. Metals and plastics, including high and low density polyethylene, allow smaller slot separations. Thus, the ratio of end-to-end separation of slots divided by slot length is less than 0.35, and the minimum slot length ½ inch.

Use of this configuration of straight slots and wedges for fender flaps allows water to be deposited back into the tire tracks, but the amount is negligible compared to that originally on the roadway and following tires may also have spray control.

The embodiment using the wedge array of FIG. 4 is easier to pull from a mold than the split flow design of FIG. 5 but not if a slight taper is introduced to make the downspray end slightly wider than the wedge end, which would serve to reduce blockage by debris.

Fender Flaps With Slanted Slots Between Closely Spaced Apart Wedges

FIGS. 5A and 5B illustrate the preferred, but most expensive embodiment, the split flow design of fender flap spray controllers 1 wherein the slots 15 slant to the left side on the left half 35 of the spray controller 306 while slots 15 on the right half 34 of the spray controller 306 are slanted to the right side to permit the now coalesced streamlike flow of water to be discharged from the slots 15 on the downspray side 47 of the spray controller 1 away from the tracks of the tires and to fall in part outside the path of the tires of the vehicle. To facilitate self cleaning, the rearward 42 and forward 41 surfaces of the slanted slots 15 may be slightly divergent to each other with the rearward surface of the slot being a continuation of the wedge sloping face half angle.

Slot widths range from 3/64 to ⅛ inch at the bases of the symmetric wedges or 1/32 to ⅛ inch between asymmetric wedges and they are contiguous thereto. The base thicknesses range from 3/32 inch to 5/16 inch, or, if hollow wedges are used, the slots have an equivalent depth. Wedges range from 3/16 to 5/8 inch high. Symmetric wedge angles are 30 to 60 degrees. Asymmetric wedge angles are a maximum of 45 degrees. Slot angles continue the wedge angle through the base, the rear wall of the slot preventing non-impact passage of throw through the base.

Excellent experimental results were obtained from the symmetric wedge embodiments of FIGS. 5A and 5B for a configuration with a base thickness ¼ inch, wedge height 7/16 inch, wedge lateral separation and slot width 1/16 inch, slot longitudinal separation ¼ inch, and length ¾ inch, and wedge apex angle 35 degrees.

Good results were also obtained using 1 inch long slots, ⅛ inch end-to-end separation, 90 durometer ⅛ inch thick red rubber, ¼ inch high asymmetric wedges having one side perpendicular to the base and the other side slanted at 35 degrees, the same slope as the 1/16 inch wide slots between.

Thus, lateral wedge separation to wedge width ratios of 25% and 36% and longitudinal slot separation to length ratios of 33% and 12.5% were used experimentally. Improved longitudinal slot separation to slot length ratio may be obtained for weaker materials by using crosswise fibers between the slot ends. Materials such as those with the trade names Aramid and Kevlar may be used. Greater lateral strength can also be obtained by molding from plastics such as low or high density polyethylene, urethane or metal. The ratio is less than 35% and the minimum length ½ inch.

Use of Fender Flaps With Overwheel Spray Controllers

It is deduced that when used with overwheel spray controllers 7 mounted above and just forward of the fender flap spray controllers that a smooth top portion 43T, i.e. with no wedges, of the fender flap spray receiving surface 47A in FIG. 28 will provide better spray control by diverting a portion of the upward moving throw to the overwheel spray controller.

Anti-sail and Anti-twist for Fender Flaps

Each fender flap embodiment may utilize anti-lift and anti-twist devices available in the market consisting of a heavy steel wire bent to enclose the lower part.

FIG. 8 is an anti-twist, anti-lift configuration. A pair of stiff anti-twist, anti-sail members 14 are embedded in or securely attached to the fender flap spray controller. The members are positioned at right angles to one another, one 14V extending vertically from the hanger area down the center where wedges are less important, abutting or attached securely to a crosswise member 14H or 14HG at or near the bottom which in turn is securely attached to or embedded in the material of the fender flap. This configuration maintains the orientation of the spray controller near to perpendicular to the planes of rotation of the tires and keeps it from lifting excessively out of position by wind forces during travel of the vehicle.

Such anti-sail and anti-twist members 14V and 14HA or an external device with or without gutter are preferably used in all embodiments of the fender flap spray controller 1.

A curved lower edge on the receiving side of the spray controller will reduce shearing into spray by forces of air flow. An external horizontal reinforcement at the bottom in FIG. 28 includes a gutter 14HG in its forward edge that drains toward the center of the vehicle.

Fender Flap Used on Automobile

FIGS. 11 and 16 illustrate any of the above described fender flap spray controllers hung behind automobile tires.

The Overwheel Spray Controller of the Vehicle Spray Control Apparatus Using Symmetric Wedges for Impact Strength FIGS. 12 and 30 to 41 show overwheel spray controllers 7 with symmetric and asymmetric wedges respectively which are most effectively positioned directly above the upward moving portion of the rotating tires 11 of the vehicle 4 where the angle of impact of thrown droplets is nearly normal to the planar surface 30 of the base 2 of the overwheel spray controller 7. Inner and outer longitudinal strips devoid of wedges and slots may run along the inner and outer edges, tilting downward to the corresponding barrier if desired to form gutters, where little upward moving throw impinges. A similar central strip is introduced over duals to prevent water from flowing downward through slots to fall upon the tire tread creating more mist. The region most directly above the top of the tire is usually avoided because of occasional tire impact against the bottom of the trailer. To avoid tire impact on the wedge array, it must be mounted on an axle fitting or, if mounted on the tractor frame or trailer, its forward edge must be a distance behind the top center of the tire dependent on wedge height and tire diameter. Lower wedges allow closer placement and thereby greater spray control coverage. Wedge heights range from 3/16 to ⅜ inch.

One preferred embodiment of the overwheel spray controller 7 utilizes the symmetric wedge 13 and slanted slot 15 arrangement of the fender flap spray controllers 1 whereby the bisectors of the sloping faces 31 of the wedges 13 are parallel to the plane of rotation of the tires 11. The overwheel spray controller 7, shown in FIGS. 12 and 13B is mounted to the vehicle 4 with two longitudinal bars 17B positioned at each side of the spray controller 7 which are welded to or are integral with a pair of embedded crosswise bars or rods 17A near opposite ends of the overwheel spray controller as shown in FIG. 12. The external longitudinal bars 17B slide into central fittings 18 which are located toward the center of the trailer 5 and lock into quickdisconnect fittings 19 with eccentric clamps 20, attached to the floor sills 21 with wing screws 22 or bolts at the sides of the trailer 5, as shown in FIGS. 13 and 14.

The supports of the overwheel spray controller 7, in reference to the fittings 18 and 19, are designed to tilt the spray controller slightly downward, rotation 156, toward the longitudinal centerline of the vehicle, if desired, especially when it is used between tandems. In addition, the supports can tilt the overwheel spray controller 7 downwardly and rearwardly, rotation 155, when it is used behind the center of the rear tires of tandems, or behind the centers of single axles.

A central longitudinal bar 17C provides stability and strength for the overwheel spray controller 7, such as supporting ice collecting on the controller 7 in winter and assists the lateral runoff of the stream-like flow of water after being discharged from the slots at the opposite side of the base 2. FIGS. 13A and 13B illustrate the path of travel of water droplets into and over the overwheel spray controllers 7 on both the right and left sides of the vehicle respectively. The left holder 19A is that shown in FIG. 15 which is designed to be mounted on tractor or trailer, the controller with or without internal reinforcement being simply inserted or removed. Ribs 23, also called barriers, along the top over the outer edge and over the front and rear ends, may be molded with or attached to the top of the overwheel spray controller 7, as shown in FIG. 12, to guide the stream-like flow of water laterally, upon flowing from the slots, toward the vehicle's center to fall in the relatively quiescent air inside the tracks of the tires 11 of the vehicle. Rear and inner barriers are essential over tandems and can be used over single axles, the inner barrier having narrow openings fore and aft for water to flow downward toward the road surface. The ribs 23 are also used to provide separation from a flat surface above or a bonding surface for attachment to flat or curved surfaces of a vehicle when used as a general purpose spray controller.

The overwheel spray controller 7 seems more effective than and may eliminate the need for side skirts 27 in that it suppresses the water throw directly, rather than simply coalescing secondary mist, by intercepting a large percentage of throw before it becomes mist. The side skirt only coalesces the mist moving outward after it is formed from high velocity throw impacting over the tire. The mist moving toward the centerline of the trailer does not normally see a side skirt.

The Overwheel Spray Controller Using Asymmetric Wedges

This example of an overwheel spray controller in FIGS. 30 to 38 uses the asymmetric wedges of FIG. 9D to direct the flow of water toward the centerline of the vehicle. It is best made of high density polyethylene and best supported by the holder of FIG. 15. Molded barriers are shown above the four edges to guide the water flow. An inner gutter is shown and the openings at either end of the inner barrier allow the water to flow in a stream toward the surface. The spray controller is interchangeable from one side of the vehicle to the other by a 180 degree rotation as is the overwheel controller of FIG. 12, the forward opening becoming the rearward. A central lateral barrier 23A shown here and in FIG. 12 extends from the outer barrier to the outside of the gutter to add lateral strength to the array if needed. Larger arrays may require additional lateral strengthening barriers.

Elongated overwheel spray controllers with several strengthening barriers may be bonded to the flat surface at the front of a trailer above the tractor tandems to allow for positioning fore and aft by an adjustable fifth wheel, the connecting plate between tractor and trailer, or for moveable axles at the rear of a trailer.

Either the symmetric or asymmetric wedge designs of overwheel spray controllers may use the "split flow" concept, half of the throw being directed to the left from the left half of the spray controller, and the other half to the right. In the split flow design, the overwheel spray controller must be horizontally oriented laterally and have gutters with openings fore and aft on both sides. It may be tilted downward aft, when installed behind rear tandems, duals or single wheels. Its value over tandems is questionable. FIGS. 39 to 41 illustrate the modifications required to change this overwheel spray controller to split flow, by introducing an outer gutter in FIG. 40, openings in the same by FIG. 41, and bidirectional wedges and slots in FIG. 39. Rotation 152 about axis 151 in FIG. 31 tilts this spray controller down aft and rotation 153 about axis 154 tilts this spray controller downward toward the center of the vehicle.

Overwheel Spray Controller Mount

The overwheel spray controller mount 63 illustrated in FIG. 15 is shown with vertical rods 50A to mount on the tractor frame. To convert to a trailer mount, the vertical rods are bent horizontally instead, as indicated with dashed lines 50B, and the outer portion of the mount and the inner horizontal extensions are attached to the floor sills with brackets. The holder, made of heavy rod, ¼ inch to ⅜ inch diameter, has four segments 52 which support the controller from below and may be used to tilt the controller slightly downward toward the center and/or the rear of the vehicle. The segments 53 at either end of the controller and 54 at the side of the controller toward the center of the vehicle are bent to hold the controller securely in place during travel. Bent section 55 is vertical and holds the controller in position after it is slipped in place under bends 53 and bend 54.

The tractor mounted overwheel spray controllers 7, or 7A, without the embedded steel, also serve to reduce spray when the tractor is running without a trailer. They can be supplemented with floor sill like frame-mounted vertical spray controllers 10 having abutting vertical wedges with vertices facing aft and a gutter below to carry the condensed throw inward to fall inside the tires. It is so mounted that it intercepts forward moving throw from the tires that would otherwise strike the driver's mirrors. Further discussion under "Floor Sill Spray Controller" follows.

The Overwheel Spray Controller Used Above Tandem Axles

It is reasoned, but not yet demonstrated experimentally, that the above spray controllers will be effective when used over the region between tandem axles without the need for a Between Tractor Tandem Spray Controller or side skirts. This is evidenced because the throw from the tractor lead tandem tires is exceptionally heavy and the droplets more massive than the droplets in the exceptionally fine mist formed by the tire-to-tire throw which impacts the tandem tire opposite at speeds of 100 mph and more. Thus the heavier more massive throw will tend to carry much of the fine mist upward with it to be suppressed, coalesced and diverted by the overwheel spray controller to fall inside the tires onto or near the tractor frame and thence to fall to the roadway through relatively quiescent air, dragged with the tractor. In this application barriers are best used on all four sides with openings fore and aft in the inner barrier to drain the gutter formed by the downward tilt of the base to the plane of vertices at the inner barrier.

The Floor Sill Spray Controller of the Vehicle Spray Control System

FIG. 19 shows floor sill spray controller 9, using symmetric or asymmetric wedges and slots all angled to direct spray toward the vehicle center, and having a barrier to prevent water flow toward the outside. It is attached to an I beam type floor sill 21 with a mounting clip 26. Upon being coalesced and directed through the slanted slots 15, the stream-like flow of water flows out from the slots on the opposite side of the base 2 and then is channeled behind the floor sill spray controller 9. Attachment of this floor sill spray controller 9 to a channel type floor sill would be similar. Three spring clips 26 hold the floor sill spray controller 9 in place. Screws, bonding cement or brackets are used as needed for non I-beam floor sills. Rubber ribs 23 are shown molded between the slots on the downspray side at the top and bottom of the floor sill spray controller 9 to assure adequate space behind the controller 9 for lateral run-off of a stream-like flow of water from the opposite side 47 of the base 2 along the floor sill 21 to fall inside the tracks of the tires of the vehicles onto the road surface through the relatively quiescent air near the center of the vehicle.

The configuration has wedge heights from 3/16 to ⅝ inch, slot width from 1/32 to ⅛ inch, and symmetric wedge apex angles from 30 to 60 degrees or asymmetric wedge angles with one side vertical and the other side sloped at angles up to 45 degrees.

The Floor Sill Spray Controller With Dam, Barrier or Gutter

FIG. 20 presents an unslotted vertical array of abutting wedges 301 with a gutter 205 having a lateral wedgelike surface 203 below and rearward to deflect throw to the wedge array above and having an outside barrier 203A to direct water flow toward the vehicle centerline where it falls in the relatively quiescent air inside the inner tire. The gutter 203 is preferably molded as an integral part of the floor sill spray controller 9A, but may be separately made of the same or different material and attached. Wedge height, symmetric or asymmetric, is as small as possible yet large enough to provide good spray control. A 7/16 inch wedge height gave good experimental results. A range from 9/32 inch to 15/32 inch will provide good spray control and yet avoid excessive height for effectiveness, lower cost and ease of installation. This design may be attached by bonding, by screws or by a bracket attached to the floor sill 21A into which it may be simply inserted and secured. With gutter an integral part of the controller, it may be attached to any type of floor sill, I beam, U beam or one with square cross section and no opening to the rear.

The Between Tractor-Tandem Spray Controller of the Vehicle Spray Control System Apparatus The between tractor-tandem spray controller 12 suppresses and coalesces road surface spray thrown from the tires between tractor-tandem dual axles 28 and 29. The tires 11 of the tractor-tandem duals partially clear a path through the road surface water for the trailer duals to follow. The water droplets of the spray thrown by the tires of the front tandem axle 28 strike the tread of the oncoming tires of the rear tandem axle 29 at speeds up to twice the vehicle velocity, often reaching 110 to 130 miles per hour, generating large amounts of very fine spray.

FIG. 17 shows the tractor-tandem bobtailing. Tractor tandem axles are spaced farther apart than trailer-tandem axles and thus permit between tractor-tandem spray controllers 12 to be mounted more readily between them. FIG. 17 shows the between tractor-tandem spray controller 12 in position between the tandem axles.

In the lower portion of the spray controller the unperforated closely spaced apart wedges 13 face forward thereby controlling spray thrown rearwardly from the front tandem 28.

The upper portion of the between tractor-tandem spray controller 12 also has an array of unslotted closely spaced apart or abutting wedges 13 extending rearwardly from the base 2, to control spray thrown forward by the tires of the rear tandem 29 near the top of the rotational path as shown in FIG. 17. It is possible to use abutting wedges in this upper portion of the spray controller 12 because less spray is generated at this particular location, the tire having spun off throw for the prior 180 degrees of rotation.

The central portion of the between tractor-tandem spray controller 12 utilizes a base having no wedges 13. This helps to decrease damage to the spray controller 12, such as from broken chains. The upper front and lower rear surfaces have no wedges.

Tread throw droplets impacting above the forward wedge portion on surface 43T of the between tractor-tandem spray controller 12 are deflected upward by the smooth upper surface of this spray controller and thereafter in part strike the lower surface of the trailer 5 above the tires 11. Use of the overwheel spray controllers 9 in combination with the between tractor-tandem spray controllers 12 has been shown experimentally to be very effective in reducing the large amount of mist generated by the throw between the tandem axles. Wedges on the forward upper surface of this spray controller are avoided because they would prevent water striking the upper portion from being deflected to the overwheel controller. Side skirts used in addition with these other spray controllers 9 and 12 will reduce the mist even more.

The between tractor-tandem spray controllers 12 must be rigidly secured within the narrow space between the tires 11 of the tandem axles. Fore and aft motion cannot be totally eliminated. Wedge height must be restricted because of restricted clearance. Shown in FIG. 21, support frame 37, comprising vertical members 32 and 33 and horizontal members 36 and 38, is secured to the tractor frame 45. Attachment members 40 and 44 are used to secure the support frame 37 to the tractor frame 45. Vertical rods 46 and 48 are embedded in the between tractor-tandem spray controllers 12 and are welded or rigidly attached to supporting cylinders 54 and 56. The supporting cylinders are in turn secured in a horizontal position on support arms 50 and 52 by split spring stops 58 and 60 and by fixed stops 62 and 64. The supporting cylinders 54 and 56 are held rigidly in place by the vertical rods 46 and 48 and are enclosed by a rubber sheath 66. The support is readily lifted from the supporting fixture on the tractor frame. The between tractor tandem spray controller can also use the split flow symmetric or asymmetric wedge arrays with slanted slots previously described at the top and bottom in the manner just described for the unslotted arrays.

General Purpose Spray Controllers of the Vehicle Spray Control System Apparatus

Figure 31:
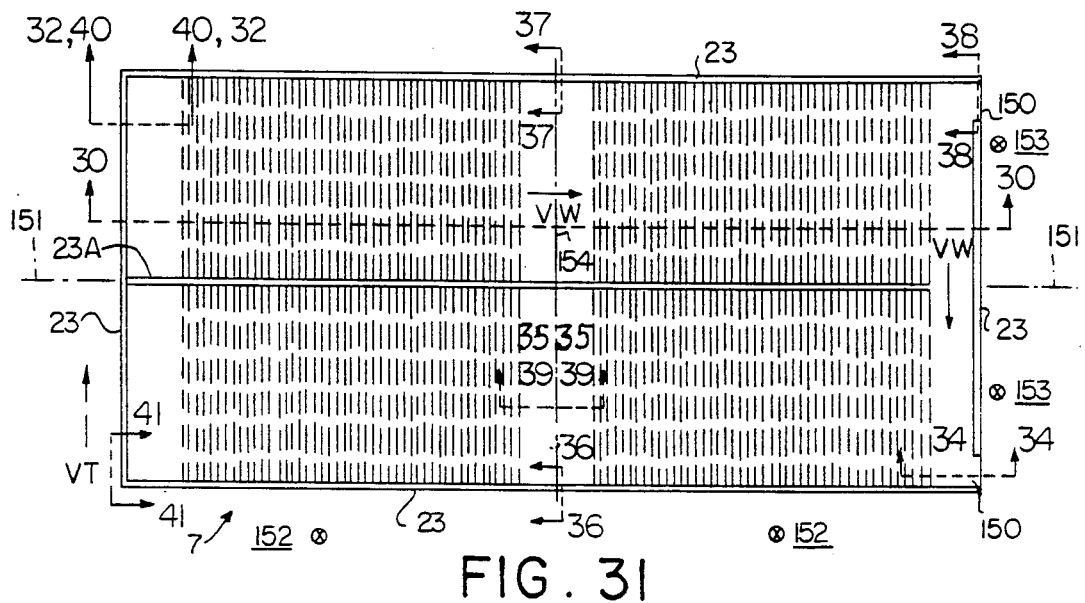
FIG. 31 is an illustration of a plan view of another possible design of the overwheel spray controller with asymmetric wedges. VT is the truck velocity and 150 shows openings in the inner barrier.

FIGS. 2, 3, 5, and the slotted portion of FIG. 30, shown in more detail in FIGS. 34 and 39, also illustrate the wedge arrays of general purpose spray controllers 10 such as are bonded to the ends of the fuel tank shown in FIG. 1 and is shown, with gutter, positioned forward of the steering axle tire shown in FIGS. 1 and 24. The general purpose spray controller is an embodiment of wedges, symmetric or asymmetric, with or without slanted slots, and with a thinner base frequently having flexibility to bond to a curved surface but also rigidly constructed when used as a shield 10 as in FIG. 17. 7/16 inch high wedges made of neoprene on a neoprene base, ⅛ inch thick, did extremely well experimentally on the ends of a fuel tank. As wedges increase in height, flexibility is lost. Thus a range of heights from 9/32 to 15/32 inch is recommended for unslotted controllers and from 3/16 to ⅝ inch for those with slanted slots. FIG. 24 shows a general purpose spray controller 10 bonded to the inside of the fender of a cab ahead of and centered at the height of the front tire 70 of the tractor 3 where the throw strikes at nearly normal incidence.

A gutter 205A formed separately and attached, or formed as an integral part of this general purpose spray controller, as with the floor sill spray controller of FIG. 20, may be used to guide the water from the spray suppressing and coalescing surface 301 to fall at least in part in the relatively quiescent air inside the paths of the rotating tires.

The slanted slot version having symmetric or asymmetric wedges and horizontal ribs behind, running across the controller between the slot ends, will allow water to flow between the ribs to fall largely beyond the wheels. This flow is enhanced by providing a slight tilt, downward toward the vehicle centerline, when mounting.

Frequently trucks have vertical surfaces ahead of single or dual tires in which the same embodiment can be applied, with or without gutter. Any surface exposed to the high speed throw from wet tires may be so protected by general purpose spray controllers designed with adequate height, width and gutter cross section. Such a spray controller with a more rigid base is shown ahead of the lead tractor tandem in FIG. 1. It is used to protect the driver's mirror and can be extended downward for general spray control. It has a gutter 205A below.

The Side Skirt Spray Controller of the Vehicle Spray Control System Apparatus

Illustrated in FIGS. 6, 7, and 25, the side skirt spray controllers 6 are positioned outside the tracks of the tires, being suspended from the vehicle adjacent to the tops of the tires 11 with the base 2 being parallel to the plane of rotation of the tires 11. In the embodiment shown in FIG. 25A the bisectors of the sloping faces 31 of the wedges 13 are positioned perpendicularly to the plane of rotation of the tires to coalesce mist which has been formed by throw impacting the underbody of the vehicle over the tires at high velocity. Mist continually flows outwardly and inwardly, with the outward flow partially impacting the side skirt, but much flowing laterally under the side skirt. Arrays of vertically oriented wedges above the gutter may be closely spaced apart, abutting, or widely spaced apart, but preferably have slanted slots between closely spaced apart wedges 13 in FIG. 5A or 13A in FIG. 35 that face rearward so the airflow outside the side skirt draws the mist through the slots, enhancing the condensation and reducing the flow of mist under the skirt. Water flows downward between the wedges and down the outer surface to the gutter 205 below to be carried rearward to fall the fender flap.

In the embodiment shown in FIG. 25B, wedges 13A in FIGS. 6 and 25B, or ridges 13B in FIGS. 25C and 7, have nearly horizontal upper surfaces. Mist impacting the side skirt and wedges or ridges then coalesces and in part flows down to the upper horizontal surfaces of the wedges or ridges and thence rearwardly driven by air motion to fall off the skirt at the location of to the fender flap, the larger amount of water falling to the road surface behind the fender flap, because of the differential pressure being lower behind the fender flap than ahead of the fender flap. Flexible side skirts on the side of the vehicle facing into a storm's crosswind deflect slightly inward making gutters of ridges or wedges on these upwind side skirts. Spaced apart ridges or wedges or abutting wedges are used. However, in respect to these side skirt spray controllers the wedge angle is not as important. However, the wedges must provide adequate surface to carry the water and adequate strength for durability. Also the may be larger spacing between wedges or ridges one half to two inches. The side skirt spray controllers 6 in FIG. 25 are secured to the trailer 5 with quick disconnect fittings 19, which further comprise locking arms 24 and hooks 25. The locking arm 24 is pivotally secured to the trailer 5 underbody to be rotatably moved upward when the side skirt spray controllers 6 are being installed or removed as shown in FIG. 25. The locking arms 24 also secure the side skirt spray controllers 6 in place. In the preferred embodiment, the side skirt spray controllers 6 have horizontally positioned wedges 34 with horizontal upper surfaces 31A without slots.

Tests have shown that a large percentage of spray thrown by the rotating tires of the moving vehicles is generated by the impact of the water droplets above the wheels and tires. Side skirt spray controllers 6 may be even more effective in controlling road surface spray than the more conventionally placed fender flap spray controllers 1 and need be only approximately six to eight inches in height to provide an effective surface area to suppress and coalesce the mist deflected to the sides of the tires. Combined with overwheel spray controllers 47A they would be superb. Some very effective overwheel spray controllers may eliminate the need for side skirts, especially at the front corners of trailers.

Some professionals are convinced that a single smooth surface coalesces this mist as effectively as a textured surface. however, review of test data seems to show that, in a cross wind, water falling from the bottoms of skirts is blown against the tires causing additional secondary spray. Thus, a gutter shown in FIG. 25A or horizontal wedges shown in FIG. 6, or horizontal ribs shown in FIG. 7, the latter two having near horizontal top surfaces, are provided to carry the coalesced water rearwardly especially on the upwind side to fall at the fender flap away from the high speed tread. The experimental symmetrical horizontal wedges had 1/16 inch wide by ⅝ inch long slots between and were made of neoprene which wets with water. Non-wetting surfaces may be less effective. The experimental device is shown in FIG. 25D.

This experimental wedge was very effective even though the 17 ½ degree upper surface sloped downwardly. The effect was actually unexpected, but the wind from the vehicle's speed blew the water rearwardly as it slowly flowed downwardly across the wedges. Horizontal upper surfaces will make them even more effective, especially on the side of the vehicle facing into the storm's cross wind which bends the flexible skirt inward converting the upper surfaces into gutters, but the coalescence and rearward motion of water along the wedges continues on skirts on the vehicle's side facing away from the storm's cross wind as the skirts bend outwardly and the wedge upper surfaces tilt downwardly, the coalesced water cleaning them as it flows downwardly and rearwardly over the wedges, blown also by the air flow from the vehicle's speed, before falling away from the tire in the cross wind.

Tire Throw Angle Coverage by Overwheel and Floor Sill Spray Controllers Compared to That by Fender Flap Spray Controllers FIGS. 26A tractor 3, and 26B trailer 5, illustrate the comparative angle coverage by various spray controllers. In FIG. 26A spray thrown from tires in angular intervals 71, 72, 74 and 76 impinges on fender flap spray controller 1B, overwheel spray controller 7 and floor sill spray controller 9, respectively. The 30 inch long fender flap spray controller 1B intercepts 39 degrees of throw between directions 91 and 92. The 26 inch width of the base 2 of the overwheel 7 and floor sill 9 spray controllers intercept 57 degrees of throw between directions 93 and 94, between 94 and 96, and between 97 and 98. Although it varies among vehicles, approximately 46 percent greater angle coverage of tire throw is obtained with only 87 percent as much area giving about 68 percent greater angle coverage per unit weight of material of the overwheel spray controller than by the fender flap spray controller 1. In FIG. 26B the same fender flap spray controller 1, because of its typical location on a trailer, gives a coverage of only 29 ½ degrees. The overwheel spray controller 7 and floor sill controller 9 combine to give 70 degree coverage with only 73 percent as much area for a 137 percent improvement compared to the fender flap spray controller 1 per unit weight of material. This coverage is reduced because the front and rear edges must be moved farther from tire centers as the wedge height increases in order to protect the controller from tire impact. Wedge heights greater than ⅝ inch are certainly undesirable, 7/16 inch is excellent on the basis of tests, but the ¼ inch asymmetric wedge height with 35 degree slots, gives manufacturing advantages, is almost as effective, and can end closer to the overwheel projection of the axle.

A combination of several embodiments of spray controllers 27 used together provides a more effective means to suppress and control spray. These examples also demonstrate significant improvement in spray control by positioning the spray controllers properly, such as by placing the fender flap spray controller 1 low and close to the tires of the vehicle. If the latter fender flap spray controllers 1 were simply lowered to approximately five inches off the ground, their angular coverage would be more than doubled to 62 ½ degrees. FIG. 27 shows a fender flap hung at an angle to improve the efficiency of spray suppression per unit length of fender flap. It, together with an overwheel spray controller is believed to provide excellent spray control, and addition of a floor sill spray controller makes coverage over the wheel fairly complete, perhaps eliminating the need for side skirts. A fender flap hung further behind a wheel provides less variation in the smallest angle of throw from the loaded to the unloaded vehicle. This advantage conflicts with the advantage of greater angle coverage when close to the wheel, unless the flap is hung from a fitting that moves up and down with the axle.

Light Weight Flexible Hangers Protect the Fender Flap Spray Controllers of the Vehicle Spray Control System Apparatus FIG. 29 shows a lightweight flexible hanger 99 to reduce fender flap spray controller 1 damage by drivers backing into loading docks for example. A spring steel angular member 102 is attached to the underbody of the trailer behind a wheel, to an I beam, channel or to the frame of the trailer 5 by bolts 100 or welding 101. The extended section 104 provides resilience to allow flexing. Quick-connect, quick-disconnect capability is provided by the hook 106 and the snap-tight projection 108. Spring action for the snap-tight projection 108 is provided by intermediate section 110. To install the fender flap spray controller 1 the top holes 111 in the flap go over the hooks 106 which pass through the fender flap spray controller 1, FIG. 28. The fender flap spray controller is then bent down into the vertical position, or to the slanted position FIG. 27, and the snap-tight projections 108 protrude through holes 112 in the fender flap spray controller 1. The snap-tight projections 108 have lower lips 114 which snap into place as the bottom of the fender flap spray controller is pressed forward, holding it secure, locking it in place and providing the anti-sail function for the flap. On removal the snap-tight projections are pressed upward to disengage the fender flap. Section 110 can be angled down aft to suspend the flap as in FIG. 27.

Manufacture of Spray Controllers Includes the Use of Plastic and Two Types of Rubber Including Fiber and New Rubber The various embodiments of spray controllers 27 can be made by using plastic, metal and/or new rubber compound, in extruding simple wedge 13 arrays, without slots 15, or in a compression or injection molding process forming embodiments with or without slots. A two-step process of first molding or extruding, then cutting out the slots, may also be used. Fiber, scrap rubber from the manufacture of tires, may also be used as the primary material, mixed with appropriate portions of compound, to minimize cost. However, high or low density polyethylene is believed to be superior in most embodiments.

SUMMARY OF ADVANTAGES

The primary embodiments of this vehicle spray control system consist of spray controllers 27 comprising arrays of sloping faced wedges 13 and 13A or ridges 13B projecting from the planar surface 30 of the base 2 with unperforated base as shown in FIGS. 2 and 3, straight slots 15A, as shown in FIG. 4, or slanted slots 15 shown in FIGS. 5A, 5B, 34 and 35 between the wedges 13 and 13A to suppress the formation of spray, and to coalesce secondary spray, the resulting water then flowing down the receiving side of the controller, passing through the controller, coalescing and being deflected while passing through the controller to thereafter fall in part outside the tracks of the tires 11 or flowing along ridges or wedges having horizontal upper surfaces to fall fender flap. The spray controllers of the system are positioned ahead of, behind, over and beside tires on vehicles 4 to coalesce spray or throw and/or suppress the formation of mist and spray that otherwise originates from the impact of high velocity water droplets on hard flat surfaces. The components of this spray control system provide excellent spray control by applying nine physical principles: First, collision energy of a droplet with a plane surface and, therefore, the amount of spray that it generates upon impact is dependent upon its speed and upon its direction of motion relative to that surface, decreasing continuously from a maximum at normal incidence to essentially zero at a direction essentially parallel to that surface. Second, spray or mist droplets condense more rapidly to form larger droplets of water as their concentration increases by compression or by glancing incidence upon a wet surface. Third, collected water per unit cross section in a straight slot to block direct non-impact passage of throw increases with wedge angle, wedge height and base thickness and with decreasing slot width. Fourth, effectiveness of spray suppression is proportional to the percent of effective wedge and slot area available for suppression not covered by accumulated water. Fifth, increasing slot width increases the flow rate of water through the slots for heavy throw rates reducing accumulated water, and thereby reducing spray generated by throw-on-water impacts. Sixth, for a given wedge angle and base thickness the ratio of wedge separation to wedge width must remain constant to maintain a given level of spray control. Seventh, throw striking a wedge array with slots passes through the slots more efficiently as the flow distance along the wedge surface decreases by approaching a normally incident impact angle to the array and as the wedge height decreases. Eighth, the effectiveness of a slotted array is increased as the end to end longitudinal separation of slots decreases as a percent of slot length. Ninth, side skirts having horizontal wedges reduce the amount of water falling directly downward beside the wheels that, in a storm's side wind, blows onto the upwind tires, and also reduces the amount of water caught in the upwind ahead of the fender flap caused by tire rotation by carrying a significant amount of water to fall from top skirt at the fender flap location, a large amount of water falling to the road surface behind the fender flap, because of the differential pressure being lower behind the fender flap than ahead of the fender flap.

Minimum usage of only the fender flap spray controllers 1 using wedge arrays illustrated in FIGS. 2, 3, and 4 and side skirts of this design effectively control only somewhat more than 30 percent of the throw angle. However, spray conditions on occasions are severe enough that this minimum usage does not provide adequate safety because about two-thirds of the throw angle is over the wheels and in other positions. On these occasions, which may be addressed by upcoming Federal standards, use of additional embodiments will reduce time lost to weather and help to avoid costly accidents.

Overwheel spray controllers 7, shown in FIGS. 1, 12, 13, 26A, 26B and 30 to 41, and floor sill spray controllers 9 in FIGS. 19A and 20 will effectively control much of the 60 percent of throw angle over the tires. Over the region between tandem axles the overwheel spray controller alone, that is without the between tractor tandem spray controllers, is expected to achieve good spray control because the heavy throw from the front tandem will sweep much of the very fine mist, formed by tire to tire throw impacts, upward with it to the overwheel spray controllers above as illustrated over the trailer tandems in FIG. 1.

Supplementing the above is the between tractor tandem spray controller 12 which, if owners can be persuaded to use it, will give even better control of the spray formed between tandems. The combined system has experimentally been demonstrated to provide excellent spray control.

General purpose spray controllers 10, with gutters below, or with slanted slots and horizontal ribs behind, as with the floor sill controller of FIG. 19A, can be used to suppress and coalesce the throw, the gutters, if present, or wedges and slanted slots directing the resulting water between the ribs to fall inside the tires in the relatively quiescent dragged air. They are best used bonded to the ends of fuel tanks, to the insides of fenders in regions that receive throw that impacts essentially normal to the surface, and as shields set up to intercept, coalesce, suppress and divert throw which would otherwise impact the tractor mirrors, the chain storage or any other surface that would convert the high speed throw to mist.

Thus, these innovations complete the protection, providing the greatest number of driving hours and the greatest safety under the widely varied weather conditions encountered on the highways of the world.

I claim:

1. A vehicle spray control system apparatus to directly receive water thrown from rotating tires of vehicles, hereinafter referred to simply as "throw" throughout all the claims, via centrifugal forces, during the travel of vehicles over wet surfaces, comprising:

a) a spray controller, in turn comprising an unperforated base, and a plurality of parallel wedges integrally formed with and projecting from the base, each wedge having:

a wedge base which is common with the base of the spray controller;

sloping sides extending from the wedge base to create a continuous apex edge having throughout an included angle which is in the range of at least 30 but no more than 40 degrees;

an apex height above the wedge base which is in the range of at least 9/32 but no more than 15/32 of an inch;

a separation between bases of adjacent wedges no more than 37% of the width of the wedge bases; and b) means to secure the spray controller to a vehicle, so the continuous apex edges of the parallel wedges are directed toward a rotating tire of a vehicle, the vertices of the wedges lying in the planes of rotation of the tire and parallel thereto.

2. A vehicle spray control system apparatus as claimed in claim 1, wherein the spray controller is suspended vertically between a forward and a rear tire which are aligned and mounted between wheels secured to tandem axles and below an overwheel spray controller, which coalesces, suppresses and deflects upward-moving throw to fall beyond the tire treads, and the lower portion of the vertical spray controller has closely spaced apart wedges extending toward the forward tire, the upper portion of the forward surface having no wedges; and the upper portion of the spray controller has abutting wedges extending toward the rear tire, the lower rearward facing surface being devoid of wedges, and which is securely held in position to prevent forward and rearward movement that would allow it to strike the tires.

3. A vehicle spray control system apparatus, as claimed in claim 1, comprising a spray controller, called a floor sill spray controller, which is adaptably supported on the rear vertical surface of a floor sill structure support member extending transversely beneath the vehicle with the wedge array vertical, apexes facing rearward to receive the forward-moving throw from the top of the tire.

4. A vehicle spray control system apparatus, as claimed in claim 3, comprising in addition a transverse gutter to receive the water collected by the floor sill spray controller and direct the collected water toward the center of the vehicle for drainage onto the wet surface below.

5. A vehicle spray control system apparatus as in claim 1, called a general purpose spray controller, in which the material of construction is flexible and the thickness of the base, up to ¼ inch, is selected to provide adequate flexibility to bond to curved surfaces such as the ends of the fuel tank and inside of the front fender and so mounted to intercept, coalesce and suppress the throw from a tire directly.

6. A vehicle spray control system apparatus as in claim 1 in which the material of construction is selected to provide rigidity for use as a shield, mounted ahead of and above a forward tandem and having an integral gutter, wedges facing rearward and downward and aligned with the rotation planes of the tires, and the gutter draining inward with water falling inside the tires.

7. A vehicle spray control system apparatus as in claim 1 in which the spray controller is rigidly mounted by a supporting structure.

8. A vehicle spray control system apparatus as defined in claim 1 which is formed as a fender flap and which is adaptably supported being a vehicle wheel, bottom sloping rearward at a range of angles with the vertical up to 30 degrees.

9. A vehicle spray control system apparatus to receive water thrown from rotating tires of vehicles, via centrifugal forces, during the travel of vehicles over wet surfaces, comprising:

a) a spray controller, in turn comprising a base which is in the range of 3/32 to 5/16 inch in thickness, having spaced slots of transverse width in the range of 1/32 to 3/32 inch and of a longitudinal length at least ½ inch with the longitudinal spacing between slots being less than 35 percent of the slot length with the slots extending perpendicularly through the base, and a plurality of spaced parallel symmetric wedges integrally formed with and projecting from the base longitudinally between the spaced slots, each wedge having:

a wedge base which is common with the base of the spray controller, with the width of the wedge base being wide enough so the wedge bases are spaced apart on either side of the spaced slots of the base at a distance, equal to the slot width, which is 22 percent or less of the respective width of the wedge bases;

sloping sides extending from and contiguous to the slot edges in the controller base to create a continuous apex edge having throughout an included angle of at least 40 degrees; and an apex edge height above the wedge base, which is in the range of 7/32 to 15/32 inch; and b) means to secure the spray controller to a vehicle, so the continuous apex edges of the parallel wedges are directed toward a rotating tire of a vehicle, whereby the planes of symmetry of the wedges are parallel to the planes of rotation of the tire.

10. A vehicle spray control system apparatus for suppressing spray and preventing the formation of mist by coalescing and redirecting water droplets from tread throw which has been thrown upwardly or rearwardly by the rotating tires of a vehicle via centrifugal forces of the rotational movement of the tires during travel of the vehicle along wet surfaces or roadways, comprising spray controllers, having a receiving side and an opposite side, and which each further comprise:

a) a base having a plurality of elongated slots longitudinally positioned and spaced apart, extending through the base angularly forming a slanted aperture through which droplets of spray pass, such droplets being suppressed upon striking wedge sloping faces and slanted surfaces of the slots and thereby directed away in part from the path of the rotating tires of the vehicle; and b) a plurality of edges with apex angles of 60 degrees or less having opposite symmetrical sloping faces symmetrically oriented toward oncoming droplets of spray wherein the wedges depend outwardly from the base toward the direction of spray and are positioned adjacent to the slots whereby a slanted surface of each slot is preferably a continuation of and integral with a sloping face of the adjacent wedge, the wedges thereby providing surface area to receive the impact of the spray water droplets thereafter suppressing and coalescing the spray droplets into larger droplets and a flow of water which is stream-like in appearance.

11. A vehicle spray control system apparatus as defined in claim 10 wherein the slots of the spray controllers are adaptably oriented within the base whereby, with respect to a longitudinal centerline of the vehicle tires, half of the slots are slanted in one direction, in parallel alignment, away from said centerline while the other half of the slots are slanted symmetrically away, in parallel alignment, from and on the opposite side of said centerline to thereby guide the flow of the now suppressed and coalesced spray to the respectively divergent halves of the spray controller and thus redirecting the flow of water droplets through the base to thereafter be discharged from the opposite side of the spray controller away from the center of the spray controller and in part away from the path of the rotating wheels and tires of the vehicle.

12. A vehicle spray control system apparatus as defined in claim 10 wherein the slots are all slanted in the same direction in parallel alignment, extending trough the base at an angle so as to discharge the water droplets from the opposite side of the spray controller laterally in one direction.

13. A vehicle spray control system apparatus, as claimed in claim 10, comprising, in addition, another spray controller, called a side skirt, which is positioned vertically beyond the vertical plane projection of a tire, having a base, having wedges preferably vertically oriented extending from the base toward the tire, having the bisector of the sloping faces of the wedges extending perpendicularly to the plane of rotation of a tire, and having the slanted slots oriented to direct outgoing air and water toward the rear.

14. A vehicle spray control system apparatus as claimed in claim 12 comprising, in addition, another spray controller, called an overwheel spray controller, which is arranged almost horizontally in the vertical plane projection of a tire, having the wedges and slanted slots arranged to suppress, coalesce and deflect the water from the throw via the slanted slots toward the center of the vehicle over the spray controller after their impacting, on the overwheel spray controller above the rear of a tire, or above and between tandems, the resulting water falling clear of the tire and clear of following tires to the wet roadway in relatively quiescent air dragged along with the vehicle, and having barriers preventing water flow off the front and outside edges of this overwheel spray controller.

15. A vehicle spray controller system apparatus as defined in claim 12 wherein the spray controller is adaptably supported on the rear vertical surface of a floor sill structural support member, extending transversely beneath the vehicle wherein a plurality of ribs are secured horizontally to the back of the base, being spaced apart and positioned transversely to the wedges and slots so as to permit runoff beyond the paths of the rotating tires toward the center of the vehicle of the coalesced and suppressed spray which has thereafter become a flow of water stream-like in appearance upon striking and then passing through the spray controller.

16. A spray control system apparatus as in claims numbers 1, 9, or 10 having the base under the wedge hollowed out so the material thickness is optimized, for speed of molding and yet retain adequate strength for the application.

17. A spray control system apparatus as in claim 1 or 9 and having means to secure the said apparatus to a vehicle to serve as a fender flap positioned behind the wheels of tractors, trailers, trucks, automobiles and aircraft to control spray thrown from tires running on wet roadways and runways.

18. A spray control system apparatus as in claim 17 in which the base opposite the edges is hollowed out to optimize the wall thickness, dependent on material, for speed of molding yet retain adquate strength.

19. A vehicle spray control system apparatus as claimed in claim 14, this overwheel spray controller with rear barrier being positioned at a slight downward slope toward the vehicle centerline to direct water flow toward the center of the vehicle.

20. A vehicle spray control system apparatus as claimed in claim 15 with rear barrier in which longitudinal strips of the base at the center and at the inner edge of this overwheel spray controller are devoid of slots and wedges over the space between tires that receives little throw when installed over duals, the inner portion of the base sloping downward to an inner barrier which has openings at the front and rear, the barrier forming the inner edge of a gutter and the openings allowing the water to stream toward the road surface clear of the tire path.

21. A vehicle spray control system apparatus as claimed in claim 13 with a gutter below to carry water rearwardly to fall behind the wheel.

22. A vehicle spray control system apparatus as in claim 11, positioned horizontally to receive the upward moving throw from tires and having strips along the inner and outer edge devoid of slots and wedges extending fore and aft which edge strips tilt downward respectively toward the center and toward the side of the vehicle, having barrier walls above each of the four edges to prevent flow off the top of the controller except that the inner and outer barrier walls have narrow openings both fore and aft to allow water to flow in a stream off the controller beyond the tires.

23. A vehicle spray control system apparatus, as claimed in claim 10, in which the slope of the slot, as measured from vertical to the base surface, is greater than the slope of the side of the wedge, thereby causing the flow of water exiting from the base to be more nearly parallel to the base surface, the slot edges at their intersections with the edge bases remaining contiguous to the wedge bases.

24. A vehicle spray control system apparatus for suppressing spray and preventing the formation of mist by coalescing and redirecting water droplets from tread throw which has been thrown upwardly, rearwardly, or forwardly by the rotating tires of a vehicle via centrifugal forces of the rotational movement of the tires during travel of the vehicle along wet surfaces or roadways, comprising spray controllers, having a receiving side and an opposite side, and which each further comprise:
   a) a base having a plurality of elongated slots longitudinally positioned and spaced apart, extending through the base angularly forming a slanted aperture through which droplets of spray pass, such droplets being suppressed upon striking wedge sloping faces and slanted surfaces of the slots and thereby directed away in part from the path of the rotating tires of the vehicle; and
   b) a plurality of wedges with apex angles of 45 degrees or less having one side substantially perpendicular to the base and the other side sloped at an angle in the range of 15 to 45 degrees, having the vertices oriented toward oncoming droplets of spray wherein the wedges depend outwardly from the base toward the direction of spray and are positioned adjacent to the slots whereby a slanted surface of each sot is preferably a continuation of and integral with a sloping face of the adjacent wedge, the wedges thereby providing surface area to receive the impact of the spray water droplets thereafter suppressing and coalescing the spray droplets into larger droplets and a flow of water which is stream-like in appearance.

25. A vehicle spray control system apparatus as defined in claim 24 wherein the slots of the spray controllers are adaptably oriented within the base whereby, with respect to a longitudinal one direction, in parallel alignment, away from said centerline while the other half of the slots are slanted symmetrically away, in parallel alignment, from and on the opposite side of said centerline to thereby guide the flow of the now suppressed and coalesced spray to the respectively divergent halves of the spray controller and thus redirecting the flow of water droplets through the base to thereafter be discharged from the opposite side of the spray controller away from the center of the spray controller and in part away from the path of the rotating wheels and tires of the vehicle.

26. A vehicle spray control system apparatus as defined in claim 24 wherein the slots are all slanted in the same direction in parallel alignment, extending through the base at an angle so as to discharge the water droplets from the opposite side of the spray controller laterally in one direction.

27. A vehicle spray control system apparatus, as claimed in claim 26, comprising, in addition, another spray controller, called a side skirt, which is positioned vertically beyond the vertical plane projection of a tire, having a base, having wedges vertically oriented extending from the base toward the tire, and having the slanted slots oriented to direct outgoing air and water toward the rear.

28. A vehicle spray control system apparatus as claimed in claim 26, comprising, in addition, another spray controller, called an overwheel spray controller, which is arranged substantially horizontally in the vertical plane projection of a tire, having the wedges and slanted slots arranged to suppress, coalesce and deflect the water from the throw via the slanted slots toward the center of the vehicle over the spray controller after their impacting, on the overwheel spray controller above the rear of a tire, or above and between tandems, the resulting water falling clear of the tire and clear of following tires to the wet roadway in relatively quiescent air dragged along with the vehicle, and having barriers preventing water flow off the front and outside edges of this overwheel spray controller.

29. A vehicle spray control system apparatus as claimed in claim 28, this overwheel spray controller with rear barrier being positioned at a slight downward slope toward the vehicle centerline to direct water flow toward the center of the vehicle, and having an inner longitudinal strip devoid of slots and wedges which tilts down to an inner barrier with openings fore and aft.

30. A vehicle spray control system apparatus as claimed in claim 29 in which longitudinal strips of the base at the center and at the inner edge of this overwheel spray controller are devoid of slots and wedges over the space between tires that receives little throw when installed over duals, the inner portion of the base sloping downward to an inner barrier, which has openings at the front and rear, the barrier forming the inner edge of a gutter and the openings allowing the water to stream outward toward the road surface clear of the tire path.

31. A vehicle spray control system apparatus as in claim 27 having an integral gutter at the lower edge of the side skirt that is designed to carry the coalesced and suppressed water to fall in proximity to a fender flap, a vertical spray controller behind a wheel.

32. A vehicle spray control system apparatus called a general purpose spray controller designed as in claim 26 in which ribs on the back surface run perpendicular to the slots and between the sots providing a means to bond the apparatus made of a flexible material to a surface impacted directly by throw such as the ends of fuel tanks or the fender ahead of a tire and allow the suppressed and coalesced water to flow behind the controller to fall at least in part inside the tires of the vehicle.

33. A vehicle spray control system apparatus called a between tractor tandem spray controller, as claimed in claim 25, wherein the spray controller is suspended vertically between a forward tire and a rear tire, which are aligned, and mounted between wheels secured to tandem axles, and below an overwheel spray controller designed to coalesce, suppress and deflect the upcoming throw beyond the tires and located over the rear of the front tandem extending to this between tractor tandem spray controller, and the lower portion of the spray controller has asymmetric wedges extending toward the forward tire but is devoid of wedges on its rearward surface, and the upper portion of the spray controller has asymmetric wedges extending toward the rear tire but is devoid of wedges on its forward surface, and which is securely held in position to prevent forward and rearward movement that would allow it to strike the tires, and which deflects symmetrically half of the efflux from the slots, both top and bottom, toward the left and the other half of the efflux, toward the right, a substantial amount falling outside the tracks of the vehicle.

34. A vehicle spray control system apparatus as claimed in claim 25 positioned horizontally to receive the upward moving throw from tires, having strips, devoid of slots and wedges, extending fore and aft, centered along the longitudinal centerline, another along the inner edge and the third along the outer edge, where little throw impinges when installed over duals, barriers along the four edges, both inner and outer barriers, inner and outer barriers having openings fore and aft, and the inner and outer strips sloping downward to their respective barriers.

35. A vehicle spray control system apparatus as claimed in claim 30 in which this overwheel spray controller may be made long enough to extend from behind the center of a forward tractor tandem tire when the fifth wheel, used to adjust the trailer position fore and aft, is in its furthest rearward position and rearward to the fender flap position, the fender flap being attached to the trailer frame, behind the rear tandem, when the fifth wheel is in its most forward position, and is attached to the surface over the tractor tandem positions.

36. A vehicle spray control system apparatus as in claim 27 in which this overwheel spray controller, attached to the trailer, is made long enough to extend from behind the center of the forward tractor tandem tire when the fifth wheel, which adjusts the fore and aft position of the trailer reactive to the tractor, is in its most rearward position, rearward to the tractor-mounted fender flap location behind the rear tandem, relative to the trailer, when the fifth wheel is in its most forward position, and is attached to the surface over the tractor tandem positions.

37. A vehicle spray control system apparatus as in claim 26 made of a rigid material and mounted ahead of and above a forward tractor tandem so it may be used as a shield to protect the rear view mirrors from throw.

38. A vehicle spray control system apparatus as in claim 26 in which the spray controller is rigidly mounted by a supporting structure.

39. A vehicle spray control system apparatus, as claimed in claims 14, 28, 27, or 22, this overwheel spray controller being positioned at a slight downward slope aft to direct more of the water to flow rearward to fall nearer the fender flap.

* * * * *

UNITED STATES PATENT AND TRADEMARK OFFICE
CERTIFICATE OF CORRECTION

PATENT NO. : 5,080,397                                    Page 1 of 2

DATED      : January 14, 1992

INVENTOR(S) : George E. Metcalf, et al

It is certified that error appears in the above-identified patent and that said Letters Patent is hereby corrected as shown below:

Column 2, line 37, after "suppressing" insert —and coalescing mist formation from the direct impact of high—
          line 59, delete "4,290,609" substituting —4,290,619—.

Column 3, line 36, delete "her" substituting —his—.

Column 6, line 4, after "fall" insert —at—.

line 5, delete "ends" substituting —than—.

Column 7, line 41, delete "by" substituting —but—.

Column 10, line 44, after "variables" add —. Fourth,—.
           line 68, after "decreases" add —. Eight,—.

Column 11, line 25, delete "Direction" substituting —Directing—.

Column 25, line 14, after "location of" delete "to".

line 27, after "ridges," insert —may be larger,—.

Column 28, line 2, after "fall" insert —at a—.

Column 30, line 41, delete "being" substituting —behind—.
Column 31, line 27, delete "edges" substituting —wedges—.
Column 32, line 43, delete "edges" substituting —wedges—.
           line 52, delete "15" substituting —19—.
           line 68, to "edge" add —s—.

Column 33, line 14, delete "edge" substituting —wedge—.
           line 43, delete "sot" substituting —slot—.
           line 53, after "longitudinal" insert —centerline of the vehicle tires, half of the slots are slanted in—.

UNITED STATES PATENT AND TRADEMARK OFFICE
CERTIFICATE OF CORRECTION

PATENT NO. : 5,080,397

DATED : January 14, 1992

INVENTOR(S) : George E. Metcalf, et al

It is certified that error appears in the above-identified patent and that said Letters Patent is hereby corrected as shown below:

Column 34, line 52, delete "sots" substituting —slots—.

Column 36, line 6, delete "27" substituting —34—
          line 25, delete "27" substituting —34—

Signed and Sealed this

Twelfth Day of October, 1993

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,080,397
DATED : January 14, 1992
INVENTOR(S) : George E. Metcalf, et al It is certified that error appears in the above-indentified patent and that said Letters Patent is hereby corrected as shown below:

Column 6, line 5, delete "at"

Column 25, line 26, delete "may be larger"

Signed and Sealed this

Twenty-eighth Day of December, 1993

Attest:

BRUCE LEHMAN

*Attesting Officer*  *Commissioner of Patents and Trademarks*